(12) United States Patent
Mehrotra et al.

(10) Patent No.: US 11,644,815 B2
(45) Date of Patent: May 9, 2023

(54) COMMON DATA PIPELINE FOR SHARING DATA ASSOCIATED WITH INDUSTRIAL AUTOMATION SYSTEMS

(71) Applicant: ROCKWELL AUTOMATION TECHNOLOGIES, INC., Mayfield Heights, OH (US)

(72) Inventors: Abhishek Mehrotra, New Berlin, WI (US); Steven P. Taylor, Madison, WI (US); Braun C. Brennecke, Pittsburgh, PA (US); Evan J. Kausalik, Appleton, WI (US); John D. Mayer, Lakewood, OH (US); Tyler C. Tamburlin, Painesville, OH (US); Richard S. Turk, Highland Heights, OH (US); Timothy R. Brennan, Bayside, WI (US)

(73) Assignee: Rockwell Automation Technologies, Inc., Mayfield Heights, OH (US)

( * ) Notice: Subject to any disclaimer, the term of this patent is extended or adjusted under 35 U.S.C. 154(b) by 161 days.

(21) Appl. No.: 17/038,776

(22) Filed: Sep. 30, 2020

(65) Prior Publication Data

US 2022/0100173 A1  Mar. 31, 2022

(51) Int. Cl.
| | |
|---|---|
| G06F 16/00 | (2019.01) |
| G05B 19/4155 | (2006.01) |
| G06F 16/907 | (2019.01) |
| H04L 67/12 | (2022.01) |

(52) U.S. Cl.
CPC ....... *G05B 19/4155* (2013.01); *G06F 16/907* (2019.01); *H04L 67/12* (2013.01); *G05B 2219/31368* (2013.01)

(58) Field of Classification Search
None
See application file for complete search history.

(56) References Cited

U.S. PATENT DOCUMENTS

| | | | | |
|---|---|---|---|---|
| 6,934,882 B2 * | 8/2005 | Barthel | ............... | G06F 11/2007 714/18 |
| 2004/0024673 A1 * | 2/2004 | Huettl | .................... | G06Q 10/06 705/36 R |
| 2005/0038676 A1 * | 2/2005 | Showalter | .............. | G06Q 10/06 705/2 |

(Continued)

OTHER PUBLICATIONS

European Search Report dated Dec. 23, 2021 for EP Application No. 21186959.9, 12 Pages.

*Primary Examiner* — Hasanul Mobin
(74) *Attorney, Agent, or Firm* — Fletcher Yoder, P.C.

(57) ABSTRACT

A non-transitory computer-readable medium includes instructions that, when executed, cause one or more processors of a first electronic device to receive data generated by a plurality of components of an industrial automation system and characterize one or more portions of the data by applying metadata to the one or more portions of the data. The metadata enables a second electronic device receiving the data to determine one or more contexts of the one or more portions of the data. Furthermore, the computer-executable instructions, when executed, cause the one or more processors to rearrange an order of the one or more portions of the data and cause the characterized and rearranged data to be sent to the second electronic device.

20 Claims, 9 Drawing Sheets

(56) References Cited

U.S. PATENT DOCUMENTS

| | | | |
|---|---|---|---|
| 2011/0022560 A1* | 1/2011 | Breiter | G06F 9/5027 |
| | | | 706/47 |
| 2014/0336791 A1* | 11/2014 | Asenjo | G05B 13/026 |
| | | | 700/44 |
| 2014/0337429 A1* | 11/2014 | Asenjo | H04L 67/10 |
| | | | 709/204 |
| 2015/0316904 A1 | 11/2015 | Govindaraj et al. | |
| 2015/0316910 A1* | 11/2015 | Kalan | G05B 19/4185 |
| | | | 700/11 |
| 2016/0011856 A1* | 1/2016 | Akatoki | G06F 3/0484 |
| | | | 715/762 |
| 2016/0048670 A1* | 2/2016 | Kim | G06V 40/1353 |
| | | | 382/125 |
| 2016/0313709 A1* | 10/2016 | Biesdorf | G06F 16/27 |
| 2016/0323392 A1* | 11/2016 | Lawson | H04L 67/51 |
| 2017/0331887 A1* | 11/2017 | Fishier | H04L 67/1087 |
| 2018/0323645 A1* | 11/2018 | Wilberforce | F24F 11/46 |
| 2019/0384255 A1* | 12/2019 | Krishnaswamy | G05B 23/024 |
| 2020/0348662 A1* | 11/2020 | Cella | H04W 52/16 |
| 2022/0100173 A1* | 3/2022 | Mehrotra | G05B 19/4185 |

* cited by examiner

COMMON DATA PIPELINE FOR SHARING DATA ASSOCIATED WITH INDUSTRIAL AUTOMATION SYSTEMS

BACKGROUND

The present disclosure generally relates to enabling devices outside of an industrial automation system to become aware of certain attributes pertaining to the industrial automation system or one or more components of the industrial automation system. More specifically, the present disclosure relates to systems and methods for implementing a common data pipeline that enables data associated with industrial automation systems to be organized in a uniform manner, characterized to provide one or more contexts for the data, and communicated in a secure manner to electronic devices outside of the industrial automation systems.

This section is intended to introduce the reader to various aspects of art that may be related to various aspects of the present techniques, which are described and/or claimed below. This discussion is believed to be helpful in providing the reader with background information to facilitate a better understanding of the various aspects of the present disclosure. Accordingly, it should be understood that these statements are to be read in this light, and not as admissions of prior art.

BRIEF DESCRIPTION

A summary of certain embodiments disclosed herein is set forth below. It should be understood that these aspects are presented merely to provide the reader with a brief summary of these certain embodiments and that these aspects are not intended to limit the scope of this disclosure. Indeed, this disclosure may encompass a variety of aspects that may not be set forth below.

In one embodiment, a non-transitory computer-readable medium includes computer-executable instructions that, when executed, cause one or more processors of a first electronic device to receive data generated by a plurality of components of an industrial automation system and characterize one or more portions of the data by applying metadata to the one or more portions of the data. The metadata enables a second electronic device receiving the data to determine one or more contexts of the one or more portions of the data. The one or more contexts include the one or more portions of the data being associated with a particular component of the plurality of components, the one or more portions of the data being associated with a particular hierarchical level of a plurality of hierarchical levels of the industrial automation system, or a type of the data. Furthermore, the computer-executable instructions, when executed, cause the one or more processors to rearrange an order of the one or more portions of the data and cause the characterized and rearranged data to be sent to the second electronic device.

In another embodiment, a computer-implemented method includes receiving, via a first electronic device, data generated by a plurality of components of an industrial automation system. The data includes a plurality of portions having an original order. The method also includes characterizing, via the first electronic device, one or more portions of the plurality of portions of the data by applying metadata to the one or more portions of the data. The metadata enables a second electronic device receiving the data to determine one or more components of the plurality of components to which the one or more portions of the data pertain. Additionally, the method includes rearranging, via the first electronic device, the data by modifying the original order of the one or more portions of the data. Furthermore, the method includes causing, via the first electronic device, the characterized and rearranged data to be sent to the second electronic device.

In yet another embodiment, a non-transitory computer-readable medium comprising computer-executable instructions that, when executed, cause one or more processors of a first electronic device to receive, from a second electronic device communicatively coupled to the first electronic device, characterized and rearranged data generated by the second electronic device. The characterized and rearranged data is generated by characterizing one or more portions of data generated by a plurality of components of an industrial automation system by applying metadata to the one or more portions of the data and rearranging an order of the one or more portions of the data. The computer-executable instructions, when executed, also cause the one or more processors of the first electronic device to determine one or more contexts of the one or more portions of the data generated by the plurality of components of the industrial automation system. The one or more contexts include the one or more portions of the data being associated with a particular component of the plurality of components, the one or more portions of the data being associated with a particular hierarchical level of a plurality of hierarchical levels of the industrial automation system, or a type of the data.

DRAWINGS

These and other features, aspects, and advantages of the present invention will become better understood when the following detailed description is read with reference to the accompanying drawings in which like characters represent like parts throughout the drawings, wherein.

DETAILED DESCRIPTION

Figure 1:
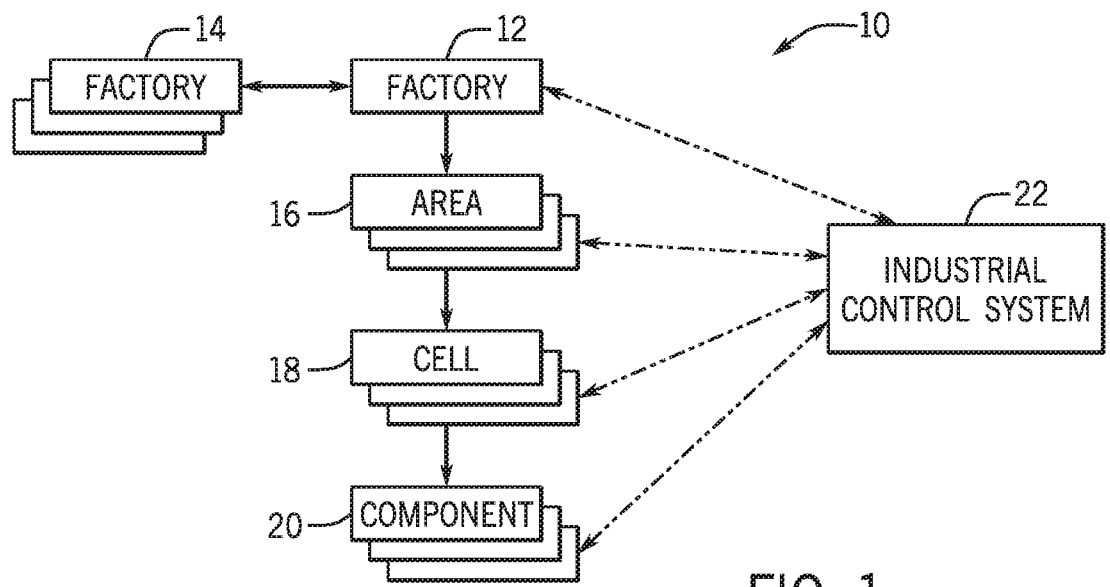
FIG. 1 illustrates a block diagram representing example hierarchical levels of an industrial automation system, in accordance with an embodiment presented herein.

One or more specific embodiments will be described below. In an effort to provide a concise description of these embodiments, not all features of an actual implementation are described in the specification. It should be appreciated that in the development of any such actual implementation, as in any engineering or design project, numerous implementation-specific decisions must be made to achieve the developers' specific goals, such as compliance with system-related and business-related constraints, which may vary from one implementation to another. Moreover, it should be appreciated that such a development effort might be complex and time consuming, but would nevertheless be a routine undertaking of design, fabrication, and manufacture for those of ordinary skill having the benefit of this disclosure.

When introducing elements of various embodiments of the present invention, the articles "a," "an," "the," and "said" are intended to mean that there are one or more of the elements. The terms "comprising," "including," and "having" are intended to be inclusive and mean that there may be additional elements other than the listed elements.

Embodiments of the present disclosure are generally directed towards an industrial automation system that may employ a number of industrial automation components to perform various industrial processes. In one embodiment, each of the industrial automation components may be capable of connecting to an industrial automation network that may facilitate communication between each of the connected industrial automation components as well as different entities. The industrial automation network may include any wired or wireless network that may be implemented as a local area network (LAN), a wide area network (WAN), and the like. Accordingly, an industrial automation component (e.g., a controller) associated with one entity (e.g., a factory) may communicate with a computing device, such as a computing device maintained by another party located outside of the factory. As an example, the factory may include an industrial automation system that communicates with one or more computing devices of another party (e.g., consumer, different manufacturer) that provides services for the industrial automation, such as data analysis, data management, diagnostic services, security services, or maintenance services. Because there are a wide variety of different automation devices which may be manufactured by different entities, communicate using varying communications protocols, or both, a party receiving data may be unable to discern or analyze data that is received from another party. For example, one or more automation components may provide data associated with an automation system or components thereof, but the computing devices receiving the data may not know the function of the devices or even what the devices are. Furthermore, because relatively large quantities of data may be transmitted between parties, transferring data constantly between parties may reduce available network bandwidth.

The present disclosure describes a uniform manner to extract data in a secure fashion. For example, as discussed herein, a common data pipeline may utilize a uniform process for collecting and managing data (e.g., end customer data) and moving the data (e.g., to or from a cloud computing device or other storage component). The common data pipeline allows data to traverse the pipeline and remain useful to an end user, while also providing relational context with respect to the origin of the data. To provide relational context, the data may be modified with a header or metadata to include some relational context with regard to the origin of the data, a hierarchical context of the source of the data, or the like.

As additionally described herein, various types of data may be grouped (e.g., packaged) and encoded before being communicated, which may reduce congestion across networks as well as enable the data to be transferred securely. A computing device that receives such data may decode the data, aggregate the data, align the data, and the like. The aligned/aggregated data may be organized or tagged, thereby enabling recipient devices to subscribe to the data output by the source or any type of data present on the common data pipeline. For example, data related to preventative maintenance may be provided as alerts via the common data pipeline using subscription services. As such, as data is made available via microservices or the like, the data may be tagged with a device identifier and include a payload representing the raw data. The data may be organized or aggregated with other available data for encryption and then transmission via the common data pipeline. Furthermore, on the egress side, based on the tags, the data may be routed to an appropriate device. For example, a cloud computing device may analyze metadata such as data tags to determine where data should be routed, and the data may be routed accordingly. As such, the techniques described herein enable data to be shared across devices in a uniform and secure manner while also providing context for the underlying data being communicated.

By way of introduction, FIG. 1 depicts a block diagram of an example of hierarchical levels that may represent an industrial automation system 10. The industrial automation system 10 may be any system in the material handling, packaging industries, manufacturing, processing, batch processing, or any technical field that employs the use of one or more industrial automation components. In one embodiment, the industrial automation system 10 may include a factory 12 that may encompass part of the entire industrial automation system 10. As such, the industrial automation system 10 may include additional factories 14 that may be employed with the factory 12 to perform an industrial automation process or the like.

Each factory 12 (or factory 14) may be divided into a number of areas 16, which may, for example, include different production processes that use different types of industrial automation components. In one example, one area 16 may include a sub-assembly production process and another area 16 may include a core production process. In another example, each area 16 may be related to a different operation being performed in the manufacturing process. For instance, in a jelly bean manufacturing system, the areas 16 may include a jelly bean making area, a packaging area, a water filtration area, and the like. In yet another example, the area may include a production line in which a particular industrial process may be performed. Referring back to the jelly bean manufacturing system example, the production line may include a cooking line in which the jelly beans may be created, a sorting line where the jelly beans may be sorted according to a respective flavor, and a packaging line where the sorted jelly beans may be packaged into boxes or the like.

The area 16 may also be associated with physical locations of a number of components 20 with respect to the industrial automation system 10. The areas 16 may also be related to different discipline areas of the industrial automation system 10, such as batch operation areas, continuous operation areas, discrete operation areas, inventory operation areas, and the like.

The areas 16 may be subdivided into smaller units, or cells 18, which may be further subdivided into components 20. Using the example described above, the sub-assembly production process area 16 may be subdivided into cells 18 that may denote a particular group of industrial automation components 20 that may be used to perform one aspect of the sub-assembly production process. As such, the cell 18 may include a portion of the area 16 such as first part of a production line. The cell 18 may also include different parts of a particular procedure.

These cells 18 may then be further subdivided into components 20, which may correspond to individual industrial automation components, such as controllers, input/output (I/O) modules, motor control centers, motors, human machine interfaces (HMIs), operator interfaces, contactors, starters, sensors, drives, relays, protection devices, switchgear, compressors, network switches (e.g., Ethernet switches, modular-managed, fixed-managed, service-router, industrial, unmanaged, etc.) and the like. Although the factory 12, the factories 14, the areas 16, and the cells 18 are termed as factories, areas, and cells, it should be noted that in various industries these groupings may be referred to differently in different industries or the like. For instance, the groupings may be termed as units, areas, sites, and the like.

The components 20 may also be related to various industrial equipment such as mixers, machine conveyors, tanks, skids, specialized original equipment manufacturer machines, and the like. The components 20 may also be associated with devices used by the equipment such as scanners, gauges, valves, flow meters, and the like. In one embodiment, every aspect of the component 20 may be controlled or operated by a single controller (e.g., control system). In another embodiment, the control and operation of each aspect of the component 20 may be distributed via multiple controllers (e.g., control system).

The components 20 may be used within the corresponding cell 18, area 16, or factory 12 to perform various operations for the respective cell 18, area 16, or factory 12. In certain embodiments, the components 20 may be communicatively coupled to each other, to an industrial control system 22, or the like. Additionally, the industrial control system 22 may also be communicatively coupled to one or more control systems that may monitor and/or control the operations of each respective cell 18, area 16, or factory 12.

As such, the industrial control system 22 may be a computing device that may include communication abilities, processing abilities, and the like. For example, the industrial control system 22 may be a controller, such as a programmable logic controller (PLC), a programmable automation controller (PAC), or any other controller that may monitor, control, and operate an industrial automation device or component. The industrial control system 22 may be incorporated into any physical device (e.g., the industrial automation components 20) or may be implemented as a stand-alone computing device (e.g., general purpose computer), such as a desktop computer, a laptop computer, a tablet computer, a mobile device computing device, or the like.

In certain embodiments, the industrial control system 22 may be implemented within devices that enable industrial automation components 20 to connect and communicate with each other. For instance, the industrial control system 22 may be implemented within network routers and/or switches. In this manner, the network routers and/or switches may host the industrial control system 22 that may be used to control and operate the industrial control components 20 that may be communicatively coupled to the respective network router and/or switch. Since network routers and/or switches may serve as a hub for data transfers between the industrial automation components 20, the industrial control system 22 embedded within the routers/and or switches may be strategically positioned within a data network to have access or receive data associated with various industrial automation components 20. As such, the industrial control system 22 may perform various types of analyses on the received data and may then control and operate the respective industrial automation components 20 more efficiently or effectively based on the results of the analyses.

In addition to the physical devices mentioned above, the industrial control system 22 may include a software-based emulation of any of the aforementioned physical devices. For example, the industrial control system 22 may be implemented as software modules that may perform similar operations as certain hardware controllers, devices, and the like. As such, the industrial control system 22 may create virtual instances of the hardware components (e.g., controllers, I/O modules). These virtual instances may provide more flexible ways in which the industrial control system 22 may be implemented to monitor and control the industrial automation components 20.

In one embodiment, the industrial control system 22 may be implemented virtually in a cloud-accessible platform (i.e., cloud-computing system), one or more servers, in various computing devices (e.g., general purpose computers), and the like. As such, the industrial control system 22 may operate as a soft controller or as a control engine running in the cloud-computing system. By virtually implementing the industrial control system 22 in a cloud-computing system, the industrial control system may use a distributed computing architecture to perform various analyses and control operations. As more data associated with the industrial automation components 20, the cells 18, the areas 16, and the factories 14 become available, the distributed computing architecture in the cloud-computing system may enable data analysis to be performed more efficiently. That is, since the cloud-computing system may incorporate numerous computing systems and processors to perform the data analysis, the results of the analysis may be available more quickly. In this way, the respective operations of the industrial automation components 20, the cells 18, the areas 16, and the factories 14 may be controlled in real-time or near real-time.

Keeping the foregoing in mind, it should be understood that the industrial control system 22, as mentioned throughout this disclosure, may be implemented as physical components and/or virtual components (i.e., software-based) used to monitor and/or operate the industrial automation components 20, the cells 18, the areas 16, and the factories 14. Moreover, by providing the ability to incorporate the industrial control system 22 into various types of environments, the industrial automation system 10 may be well suited to expand and grow with the addition of new industrial automation components 20.

Figure 2:
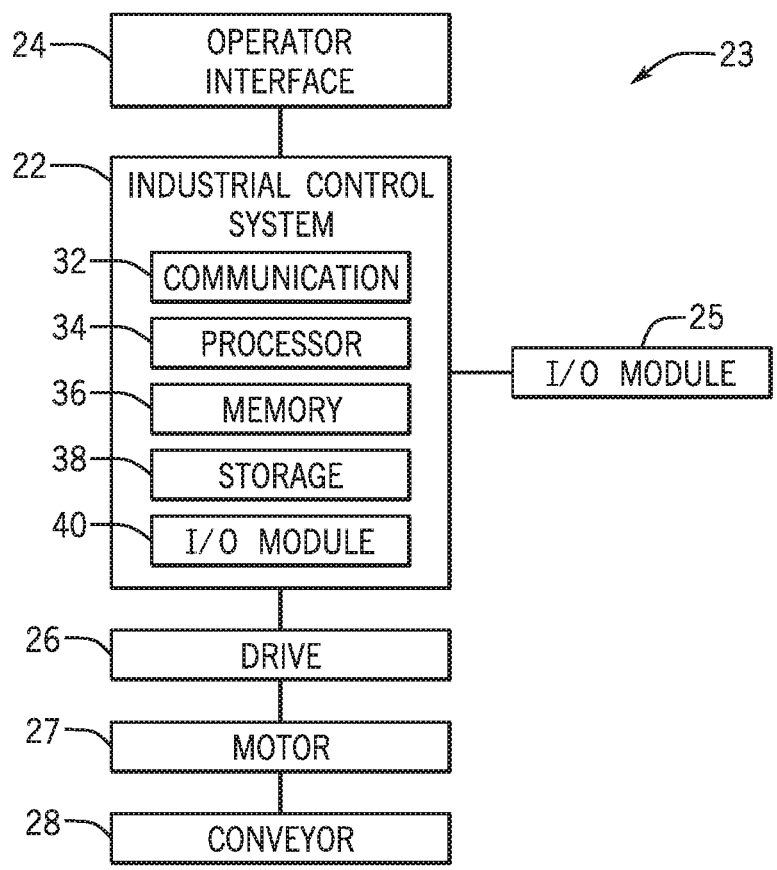
FIG. 2 illustrates a block diagram of an example control system that may be employed within the industrial automation system of FIG. 1, in accordance with an embodiment presented herein.

FIG. 2 illustrates an example control system 23 that may be employed with the industrial control system 22. As shown in FIG. 2, the industrial control system 22 may be communicatively coupled to an operator interface 24, which may be used to modify and/or view the settings and operations of the industrial control system 22. The operator interface 24 may be a user interface that may include a display and an input device used to communicate with the industrial control system 22. The display may be used to display various images generated by industrial control system 22, such as a graphical user interface (GUI) for operating the industrial control system 22. The display may be any suitable type of display, such as a liquid crystal display (LCD), plasma display, or an organic light emitting diode (OLED) display, for example. Additionally, in one embodiment, the display may be provided in conjunction with a touch-sensitive mechanism (e.g., a touch screen) that may function as part of a control interface for the industrial control system 22. In some embodiments, the operator interface 24 may be characterized as a human-machine interface, a human-interface machine, or the like.

The industrial control system 22 may also be communicatively coupled to input/output (I/O) modules 25. The I/O modules 25 may enable the industrial control system 22 to communicate with various devices in the industrial automation system. Moreover, the I/O modules 25 may enable the industrial control system 22 to receive information from the various devices, such that the information may provide reference points and other details regarding the industrial automation system to assist the industrial control system 22 to become aware of the environment in which the industrial control system 22 may be operating.

Generally, the industrial control system 22 may also be communicatively coupled to a certain device that may be used to control or manage the operation of the industrial automation system. For instance, in one embodiment, the industrial control system 22 may be coupled to a drive 26. The drive 26 may be an electrical drive that may convert an input alternating current (AC) voltage into a controllable AC voltage using a rectifier circuit and an inverter circuit. The industrial control system 22, in one embodiment, may be a controller that may control the operation of the drive 26. The drive 26 may be coupled to a motor 27, which may operate a component such as a conveyor 28 or the like. In one embodiment, the industrial control system 22 may be communicatively coupled to the operator interface 24, the I/O module 25, the drive 26, or the like via a communication network such as EtherNet/IP, ControlNet, DeviceNet, or any other industrial communication network protocol.

Keeping the example control system 23 in mind and referring to FIG. 1, the drive 26, the motor 27, and the conveyor 28 may each be considered to be a single component 20. However, the drive 26, the motor 27, and the conveyor 28 may also be considered to be a part of a particular cell 18, area 16, and factory 12. Accordingly, the industrial control system 22 may have the ability to adjust the operation of the component 20, the cell 18, the area 16, and the factory 12. For example, by adjusting the operation of the drive 26, the industrial control system 22 may adjust the operation of the motor 27 and the conveyor 28. Consequently, the industrial control system 22 may adjust the operation of the cell 18, the area 16, and the factory 12 having the conveyor 28 as a component. By understanding how each component 20 may be related to the industrial automation system 10 with respect to each area 16, each cell 18, and each component 20, the industrial control system 22 may begin to become capable to manage the operations (e.g., production, energy usage, equipment lifecycle) of the industrial automation system 10 more efficiently.

As mentioned above, the industrial control system 22 may be a controller or any computing device that may include communication abilities, processing abilities, and the like. For instance, as illustrated in FIG. 2, the industrial control system 22 may include a communication component 32, a processor 34, a memory 36, a storage 38, input/output (I/O) ports 40, and the like. The communication component 32 may be a wireless or wired communication component that may facilitate communication between the industrial automation components 20, the control systems for the factory 12, the area 16, the cell 18, and the like. The processor 34 may be any type of computer processor or microprocessor capable of executing computer-executable code. The processor 34 may also include multiple processors that may perform the operations described below. The memory 36 and the storage 38 may be any suitable articles of manufacture that can serve as media to store processor-executable code, data, or the like. These articles of manufacture may represent computer-readable media (i.e., any suitable form of memory or storage) that may store the processor-executable code used by the processor 34 to perform the presently disclosed techniques. The memory 36 and the storage 38 may also be used to store the data, analysis of the data, and the like. The memory 36 and the storage 38 may represent non-transitory computer-readable media (i.e., any suitable form of memory or storage) that may store the processor-executable code used by the processor 34 to perform various techniques described herein. It should be noted that non-transitory merely indicates that the media is tangible and not a signal.

The I/O ports 40 may be interfaces that may couple to the I/O modules 25 discussed above. Moreover, while the industrial control system 22 is illustrated as including the communication component 32, processor 34, memory 36, storage 38, and input/output (I/O) ports 40, it should be noted that the control system for the factory 12, the area 16, the cell 18, and the like may also include the same components to perform the various techniques described herein.

Keeping the foregoing in mind, the industrial control system 22 may use the communication component 32 to communicatively couple to one or more control systems. The industrial control system 22 may also monitor and/or control the operations of each respective component 20, cell 18, area 16, or factory 12. For example, the industrial control system 22 may receive data received from assets, controllers, and the like (e.g., the components 20) that may be located in the factory 12, the areas 16, or the cells 18. In one embodiment, the industrial control system 22 or a control system for each area 16, cell 18, or component 20 may receive information related to how the industrial automation system 10 may be subdivided, how each area 16, cell 18, and component 20 may interact with each other, which components 20 are part of each factory 12, area 16, or cell 18, or the like. For example, each area 16 may be related to a particular process of a manufacturing process. As such, the information received by the respective control system may detail which processes performed in certain areas 16 may depend on other processes being completed in other areas 16.

In certain embodiments, the respective control system may determine how each component 20 may relate to a respective cell 18 or area 16 based on data received from each respective component 20. For instance, a control system of a first component 20 may receive data from multiple other components 20, such as a motor for a conveyer belt and a compressor for some industrial automation device. Upon receiving the data from a second component 20 that corresponds to the motor for the conveyer belt, the control system of the first component 20 may determine that the second component 20 is associated with some cell 18, which may be part of some area 16, based on a speed in which the motor may be operating. That is, the control system of the first component 20 may refer to information, such as system design parameters for the industrial automation system 10, and determine where the motor is located by identifying a motor with operating parameters, as specified by the system design parameters, having a substantially similar speed as the received speed. In certain embodiments, the speed at which the motor may be operating may not be sufficient to identify a particular motor if other motors in the industrial automation system 10 are operating at the same speed. As such, the control system may identify a motor by monitoring a speed profile (i.e., speed curve over time) of each motor in the industrial automation system 10. Additional ways in which a control system may identify particular components 20 may include monitoring an operating mode (e.g., running/stopped/paused) of each component 20, examining network related information (e.g. IP addresses, MAC addresses, sub-net masks, or a combination of any of these, etc.) associated with each component 20, monitoring operating temperatures of each component 20 if available (e.g., components 20 in certain cells 18 are exposed to more heat/cold than others cells 18), monitoring energy consumption data associated with each component (e.g., larger drives could be part of and used in certain cells 18 while smaller drives are used in other cells 18), and so forth.

Figure 3:
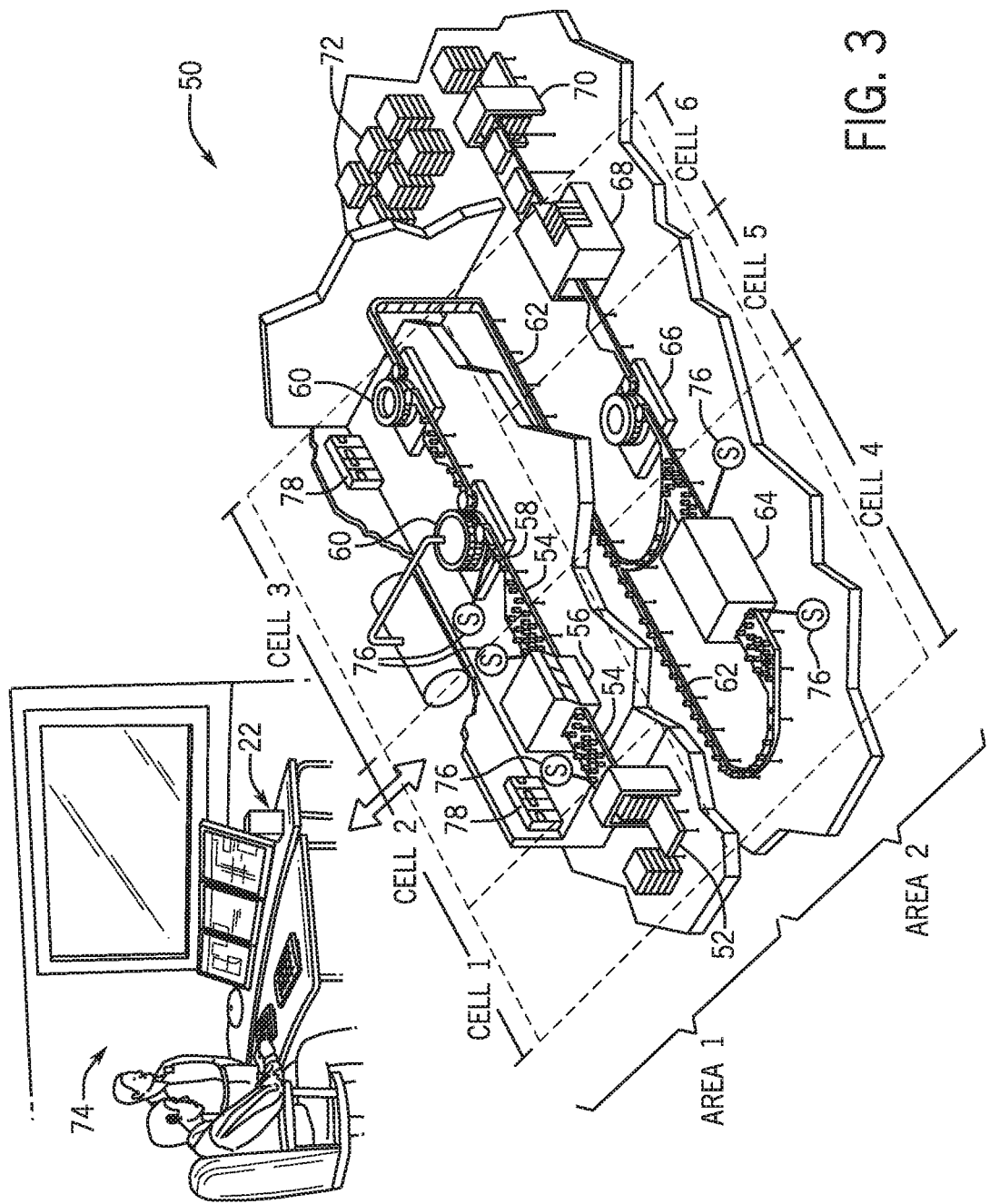
FIG. 3 illustrates an example of the industrial automation system of FIG. 1, in accordance with an embodiment presented herein.

In any case, after analyzing the data associated with each component 20, the control system of the first component 20 may determine its relationship with other components 20 of the industrial automation system with respect to the various scopes or hierarchical levels of the industrial automation system 10. By understanding the relationship to other components 20 with respect to various scopes of the industrial automation system 10, the control system of the first component 20 may become aware of conditions occurring in processes, areas 16, or cells 18 that may directly or indirectly affect the operations of the first component 20. As such, the control system of the first component 20 may adjust its operations and send commands to other components 20 to adjust their respective operations to compensate or minimize negative consequences that may occur due to the conditions in the areas 16, the cells 18, or the like. For example, production capacity of upstream or downstream cells being automatically adjusted by control systems in the respective cells by monitoring production levels of the cells adjacent to or related to the respective control system. As a result, the control systems may optimize production of the industrial automation system 10 by reducing the effects of bottlenecks cells that may lead to over or under production. In another example, sections of a conveyor used to transport materials may start adjusting their respective speeds based on other sections of the conveyor or production variances associated with the area 16, the cells 18, or the entire factory 12. In yet another example, the control system of the first component 20 may take into account energy consumption data associated with a second component to adjust the operation of the first component 20 (e.g. go to a lower energy consumption mode to maintain overall consumption constant, etc.). Additionally, after each component 20 becomes aware of the presence or existence of another component 20, some of the components 20 may negotiate and determine an optimal production rates for each component 20 based on predetermined criteria such as energy consumption/rates, production mix, production levels, and the like. Keeping the foregoing in mind, an example industrial automation system 10 of a packaging factory 50 and how the packaging factory 50 may be divided and sub-divided into areas 16 and cells 18 are depicted in FIG. 3. As illustrated in FIG. 3, the packaging factory 50 may represent an exemplary high-speed packaging line that may be employed in the food and beverage industry that may process beverage containers (i.e., a beverage line). As such, the packaging factory 50 may include industrial automation components that, for example, may enable machine components to fill, label, package, or palletize containers. The packaging factory 50 may also include one or more conveyor sections that may transport, align, or buffer containers between the machine components. Although FIG. 3 illustrates a packaging factory, it should be noted that the embodiments described herein are not limited for use with a packaging factory. Instead, it should be understood that the embodiments described herein may be employed in any industrial automation environment.

As illustrated in FIG. 3, the packaging factory 50 may include machine components configured to conduct a particular function with respect the beverage packaging process. For example, the beverage packaging process begins at a loading station 52, where pallets of empty cans or bottles to be filled are fed into packaging factory 50 via a conveyor section 54. The conveyor section 54 transports the empty cans from the loading station 52 to a washing station 56, where the empty cans and bottles are washed and prepared for filling. As the washed cans and bottles exit the washing station 56, the conveyor section 54 may gradually transition into an aligning conveyor section 58, such that the washed cans and bottles enter a filling and sealing station 60 in a single-file line.

The filling and sealing station 60 may function at an optimal rate when the washed cans and bottles enter the filling and sealing station 60 in a steady, uniform stream. However, if the transition between the conveyor section 54 and the aligning conveyor section 58 is erratic or faster than desired, the filling and sealing station 60 may not function at an optimal rate. As such, optimizing performance parameters (e.g., speed, size, function, position/arrangement, or quantity) of the conveyor sections (i.e., conveyor section 54 or aligning conveyor section 58) may be beneficial to the efficiency of the packaging factory 50.

As the sealed cans exit the filling and sealing station 60, a buffering conveyor section 62 may hold the sealed cans to delay their entry into the next station. In addition, the buffering conveyor section 62 may transport the sealed cans in a single-file line so that the sealed cans arrive at a sterilization station 64 or a labeling station 66 at a desired time with the desired quantity of cans. Similar to the filling and sealing station 60, the packaging station 64 or the labeling station 66 functions efficiently when the buffering conveyor section 62 operates at optimal performance parameters (e.g., optimal speed, size, function, position/arrangement, or quantity). After the cans and bottles have been sterilized and/or labeled, they are packaged into cases (e.g., 6-pack, 24-pack, etc.) at a packaging station 68, before they are palletized for transport at station 70 or stored in a warehouse 72. Clearly, for other applications, the particular system components, the conveyors and their function will be different and specially adapted to the application.

The packaging factory 50 may also include the industrial control system 22, which may be located in a control room 74 or the like. The industrial control system 22 may be coupled to one or more sensors 76, which may monitor various aspects of the machine components or conveyor sections of the packaging factory 50. The sensors 76 may include any type of sensor, such as a pressure sensor, an accelerometer, a heat sensor, a motion sensor, a voltage sensor, and the like. The sensors 76 may be located in various positions within the packaging factory 50 and may measure a parameter value of interest relating to the beverage packaging process during the operation of the packaging factory 50. For example, in certain embodiments, the sensors 76 may include sensors configured to measure the rate of bottles or containers per minute (BPM) entering or leaving a machine component (i.e., stations 54, 56, 58, 64, 66, 68 or 70), or the rate of accumulation of bottles on a portion of a conveyor section (e.g., conveyor section 54 or 62). In general, any sensors 76 capable of measuring a parameter value of interest relating to the beverage packaging process of the packaging factory 50 (e.g., rate, pressure, speed, accumulation, density, distance, position/arrangement, quantity, size, and so forth) may be used.

In some embodiments, the packaging factory 50 may include a number of industrial automation power components 78 that may be used to control power used by various machine components in the packaging factory 50. The power components 78 may include devices, such as drives, motors, inverters, switch gear, and the like, which may be used to operate a corresponding machine component. For example, the conveyor section 54 may rotate using a motor, which may be controlled via a power component 78, such as a variable frequency drive.

The power component 78 may include a control system that may monitor and control the operations of the respective power component 78. As such, the power component 78 may correspond to the component 20 described above with respect to FIG. 1. Referring back to the example above, the control system of the power component 78, such as the drive used to control the motor rotating the conveyor section 54, may monitor a voltage provided to the motor and may determine the speed at which the conveyor section 54 may be moving. In one embodiment, the control system of the power component 78 may send the data related to the speed at which the conveyor section 54 may be moving to the industrial control system 22 or to other control systems that may control other components 20. In this manner, the industrial control system 22 or other control systems may be aware of the operations of the power component 78 and may account for these operations when determining how its respective component should operate.

Keeping the packaging factory 50 of FIG. 3 in mind, the industrial control system 22 may receive data from multiple power components 78 dispersed throughout the packaging factory 50. The industrial control system 22 may then contextualize the received data with respect to different scopes or hierarchical levels as described above with reference to FIG. 1.

Figure 4:
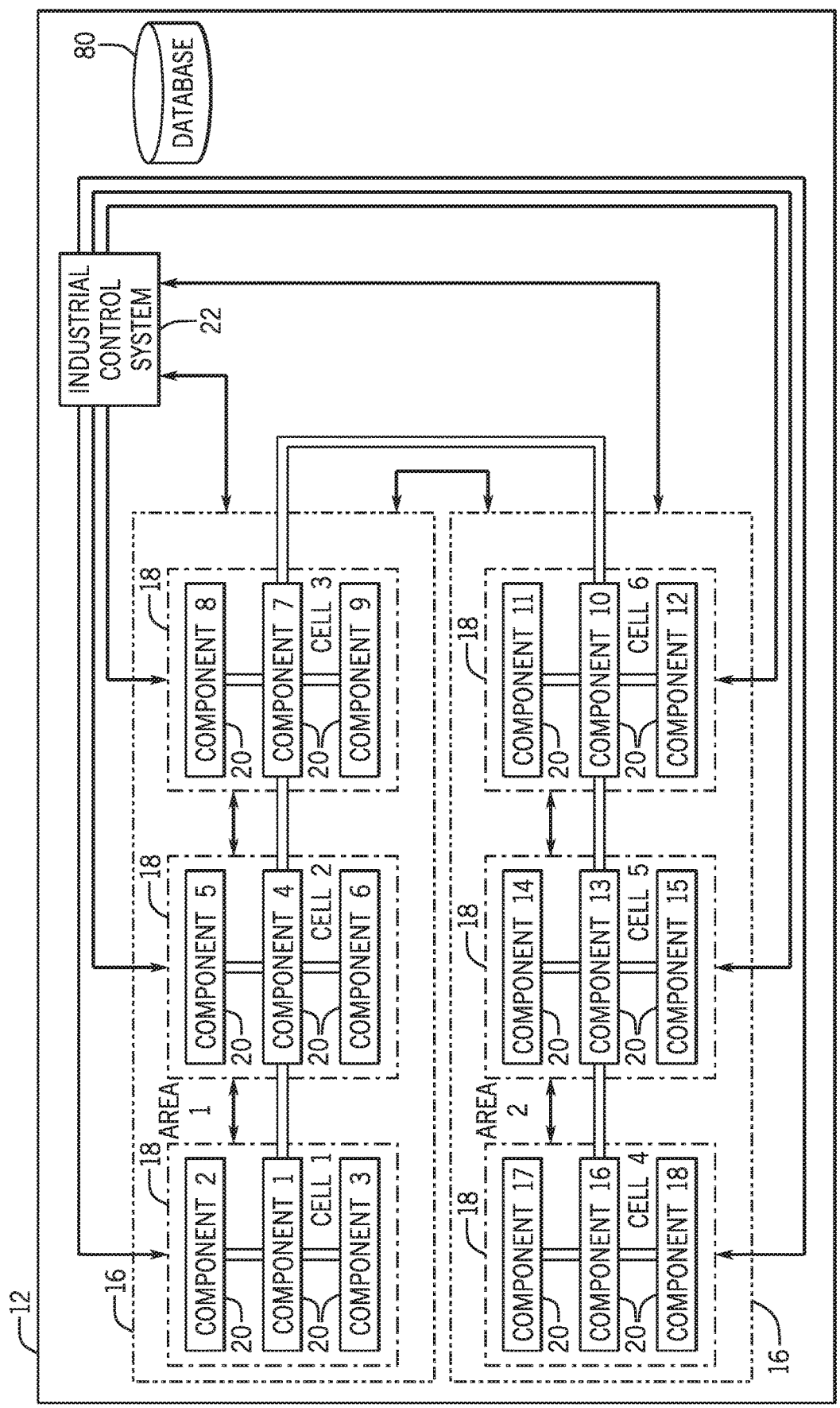
FIG. 4 illustrates a block diagram that depicts hierarchical levels of the example industrial automation system of FIG. 4, in accordance with an embodiment presented herein.

In one embodiment, the scopes of the packaging factory 50 may be categorized based on functions of the components 20 and the cells 18 of the packaging factory 50. For instance, referring to both FIGS. 3 and 4, the loading station 52 may be categorized as cell 1, the washing station 56 may be categorized as cell 2, the sealing station 60 may be categorized as cell 3, the sterilization station 64 may be categorized as cell 4, the labeling station may be categorized as cell 5 and the packaging station 68 may be categorized as cell 6. As shown in FIG. 4, each component 20 may correspond to a particular cell 18. That is, each component 20 that may be used by the respective station may be categorized as part of the respective cell 18.

In the same manner, the areas 16 may be categorized based on functions of the cells 18 of the packaging factory 50. For instance, cells 1-3 of the packaging factory 50 may correspond to a preparation process and cells 4-6 of the packaging factory 50 may correspond to a packaging process. As such, cells 1-3 may be categorized as area 1 and cells 4-6 may be categorized as area 2.

In one embodiment, the industrial control system 22 may determine the categories or scopes of the industrial automation system 10 based on a factory diagram or specification that describes the various processes employed by the industrial automation system 10 and the components 20 used for the respective processes. In another embodiment, each control system for each component 20 may include information indicating the function of the component 20, a location of the component 20 with respect to the industrial automation system 10, a part of a manufacturing process that the component 20 is associated with, or the like. Here, each respective control system of each respective component 20 may send this information to the industrial control system 22 or to other control systems of nearby components 20. The control system that receives the information may then determine how the component 20 that transmitted the information may relate to the various scopes of the industrial automation system 10, how the component 20 that received the information may be related to the component 20 that transmitted the information with respect to the various scopes of the industrial automation system 10, and the like. In certain embodiments, each control system may send information related to the scopes of the industrial automation system 10, information detailing a relationship between each scope of the industrial automation system 10, information detailing a relationship between each component 20 in the industrial automation system with respect to each scope of the industrial automation system 10, and the like to a database 80, which may be accessible by each control system as a centralized database or a database distributed between a number of machines, computers, or the like.

Common Data Pipeline

Figure 5:
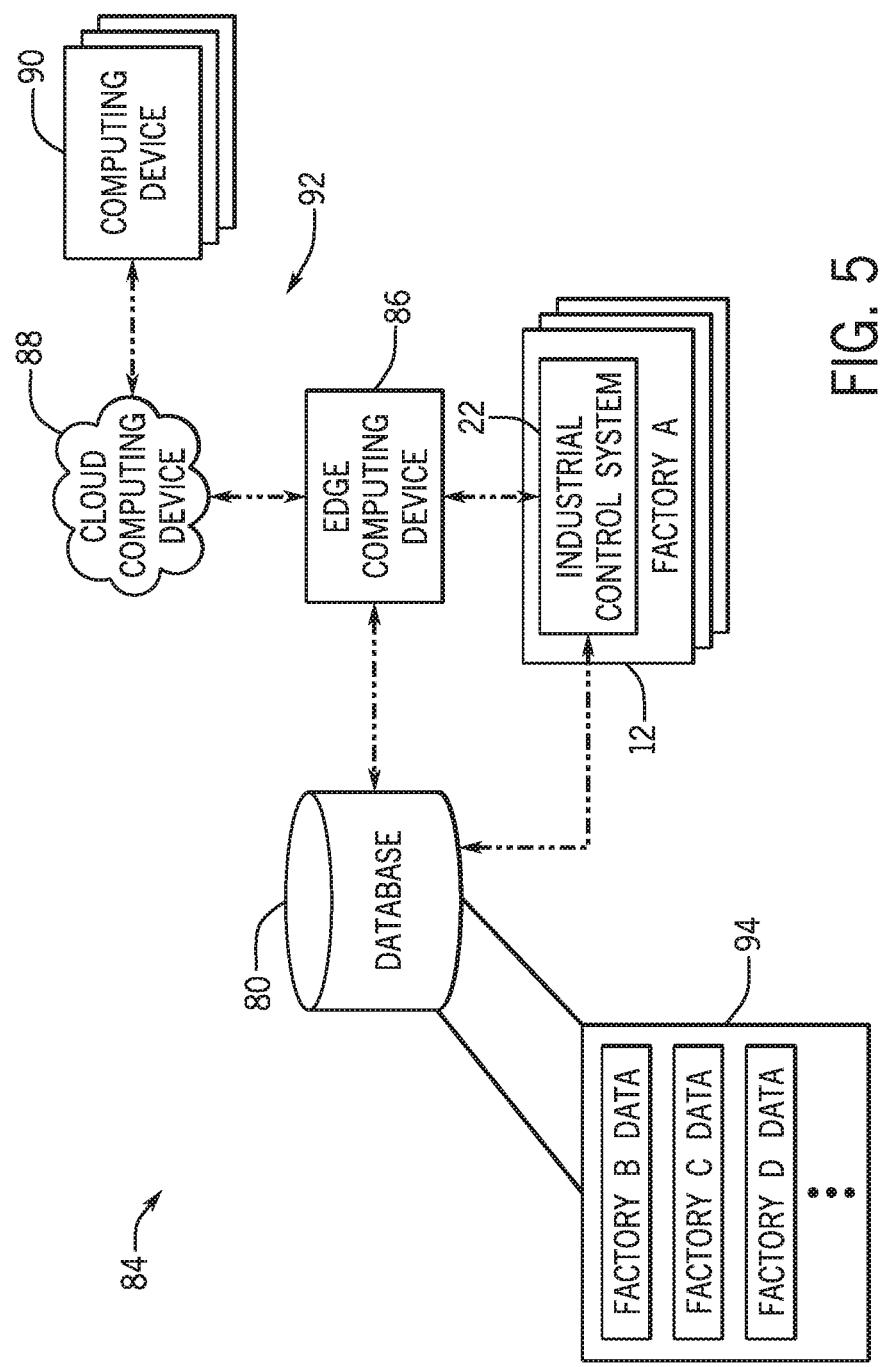
FIG. 5 illustrates a block diagram of a data analysis system, in accordance with an embodiment presented herein.

Additionally, the industrial control system 22 may communicate with other computing devices, such as computing devices not included in the factory 12 that may be controlled by other entities. For example, FIG. 5 depicts a data analysis system 84 that includes the factory 12 (which includes the industrial control system 22), the database 80, an edge computing device 86, a cloud computing device 88, and one or more other computing devices 90. The industrial control system 22 and database 80 may communicate with one another as discussed above. Moreover, the industrial control system 22 and database 80 may be communicatively coupled to the edge computing device 86, which may be a computing device such as a computer, server, router, routing switch, or integrated access device (IAD) that manages the flow of data into and out of a network, such as industrial automation network included in the factory 12 (e.g., a network utilized by the industrial control system 22 to communicate with the components of the industrial automation system 10 and the database 80). Accordingly, the edge computing device 86 may be included within the industrial automation system 10. Furthermore, while FIG. 5 includes a single edge computing device 86, in other embodiments, the data analysis system 84 may include more than one edge computing device 86.

The computing devices 90 may include computers, servers, or the like that are operated or managed by other entities. For example, the computing devices may be associated with other factories or an entity that provides one or more services for the factory 12 (or industrial automation system 10), such as data management, data analysis, security services, or diagnostic services (e.g., to determine or resolve potential errors associated with the industrial automation system 10 or the operation thereof). The computing devices 90 may communicate with the industrial automation system 10 (e.g., via the industrial control system 22) and database 80 via the cloud computing device 88 and the edge computing device 86 utilizing a common data pipeline that may be partially implemented via communication link 92. The communication link 92 may include communication infrastructure, such as a wired connection, wireless connection, or both that communicatively couples the edge computing device 86, the cloud computing device 88, and the computing devices 90 to one another. The common data pipeline generally refers to a communication infrastructure (e.g., the communication link 92) as well as one or more processes utilized to send, receive, and characterize data that is communicated using the communication infrastructure. As such, the techniques described herein may be implemented using already existing communication infrastructure (e.g., wired networks, wireless networks, or a combination thereof), thereby avoiding adding more communication infrastructure in potentially already crowded industrial environments.

The edge computing device 86, the cloud computing device, and the computing devices 90 may each include one or more processors that execute computer-readable instructions, such as instructions that may be stored in memory or a storage device that the edge computing device 86, the cloud computing device, and the computing devices 90 may also include. By executing such instructions, the one or more processors included in the edge computing device 86, the cloud computing device, and the computing devices 90 may communicate with one another via the common data pipeline, which is discussed below in more detail with respect to FIG. 6. In other words, the edge computing device 86, the cloud computing device 88, and the computing devices 90 may include the communication component 32, processor 34, memory 36, storage 38, and input/output (I/O) ports 40 described above and utilize these components to enable communication via the common data pipeline. Before proceeding to discuss the common data pipeline in more detail, it should be noted that, in other embodiments, the data analysis system 84 may not include the cloud computing device 88. In such embodiments, the computing devices 90 may communicate with the industrial control system 22 and database 80 via just the edge computing device 86. Furthermore, in some embodiments, the cloud computing device 88 may be implemented in the form of a system that includes more than one computing device.

The industrial control system 22 and the database 80 may share various types of data with the computing devices 90 using the common data pipeline. Likewise, the computing devices 90 may communicate with the industrial control system 22 and the database 80 via the common data pipeline. For example, the industrial control system 22 and database 80 may share data regarding the factory 12 (and data 94 regarding factories 14 in the case of the database 80) or components thereof with the edge computing device 86, which may selectively communicate the data to the cloud computing device 88. For instance, as described in more detail below, the edge computing device 86 may group data received from the industrial automation system 10 (e.g., via industrial control system 22 or the database 80), apply metadata 104A (e.g., data tags) to the received data, or both as part of a protocol before sending the data to the cloud computing device 88. By doing so, data associated with the factory 12 (or factories 14) may be characterized in a way that enables the cloud computing device 88 to determine which of the computing devices 90 to which to send the data. Moreover, characterizing the data enables the computing devices 90 and the cloud computing device 88 to interpret the data. For instance, as described above, the data associated with the factory 12 may pertain to a plethora of different devices that are made by different manufacturers and communicate using different protocols, such as FactoryTalk Live Data, EtherNet/IP, Common Industrial Protocol (CIP), OPC Direct Access (e.g., machine to machine communication protocol for industrial automation developed by the OPC Foundation), or any suitable communication protocol (e.g. DNP3, Modbus, Profibus, LonWorks, DALI, BACnet, KNX, EnOcean). By characterizing the data, the computing devices 90 and the cloud computing device 88 can determine what each particular portion of the data is. This may enable the computing devices 90 and cloud computing device 88 to determine a layout of the factory 12, the automation devices included in the factory 12 (or factories 14), and what the various forms of received data are (e.g., power consumption data, log files, or other data associated with the factory 12 (or factories 14).

Figure 6:
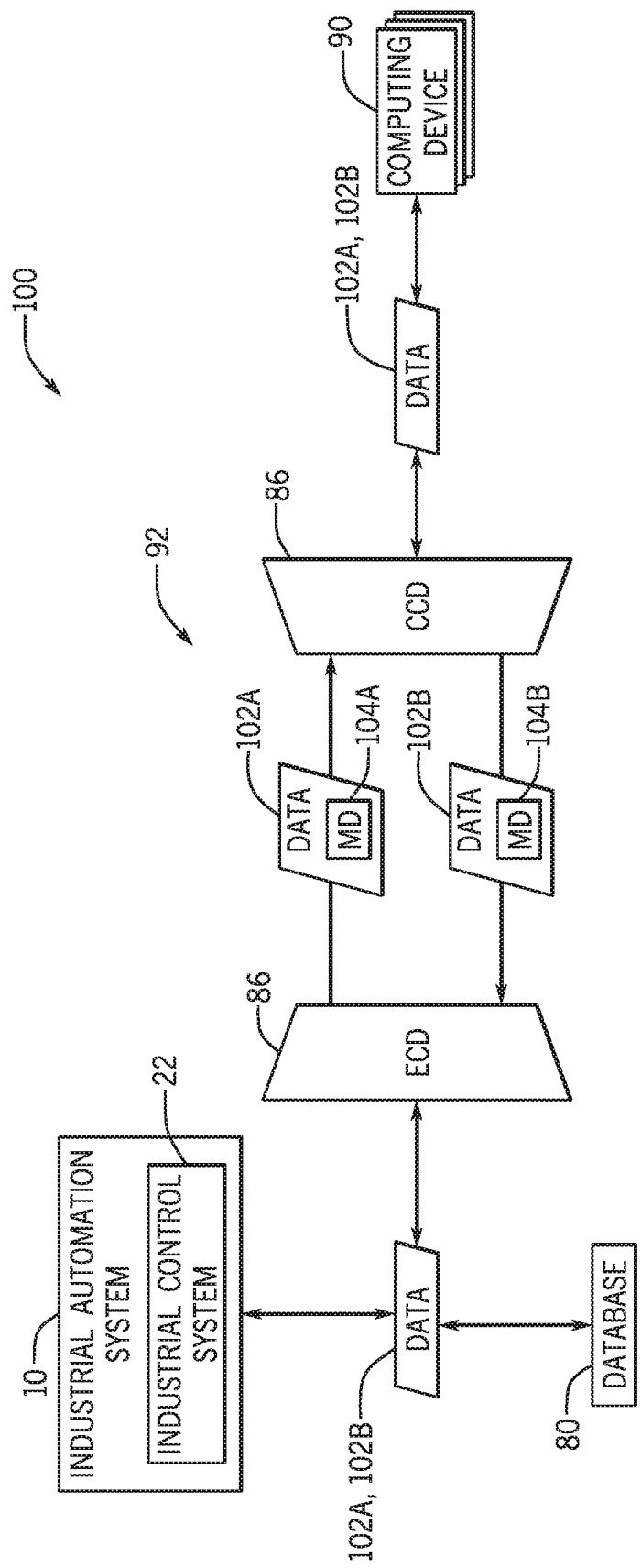
FIG. 6 illustrates a data communication system, in accordance with an embodiment presented herein.

To help elaborate, FIG. 6 illustrates a data communication system 100 that includes the communication link 92 as well as the industrial automation system 10, the database 80, the edge computing device 86, the cloud computing device 88, and the computing devices 90. Data 102A from the industrial automation system 10 and the database 80 may be shared with the computing devices 90 via the common data pipeline, which can entail the data 102A being provided to the edge computing device 86 and cloud computing device 88 (e.g., via the communication link 92). For example, for communication from the industrial automation system 10 (or database 80) to the computing devices 90, the edge computing device 86 may function as an ingress to the communication link 92 (and common data pipeline). The edge computing device 86 may communicate the data 102A in a secure manner (e.g., by encrypting the data 102A) with the cloud computing device 88, which functions as an egress from the communication link 92 (and the common data pipeline). The cloud computing device 88 or computing devices 90 may decrypt the received data 102A.

The data 102A may include a variety of different types of data that can be associated with the industrial automation system 10 or components thereof (e.g., the industrial control system 22, components included in the factory 12, or other electronic devices included in the industrial automation system 10). For example, the data 102A may include, but is not limited to, image data (e.g., video data) collected by one or more cameras included in the industrial automation system 10, audio data collected by one or more audio sensors (e.g., microphones) included in the industrial automation system 10, log files generated by the industrial control system 22, data regarding the components of the industrial automation system 10, information regarding software utilized by the industrial automation system 10 or components thereof, and inventory data. Log files may include files that provide information about the components of the industrial automation system 10, such as operation histories, maintenance histories, electrical power consumption data, and the like. Log files may also include information about users who access (e.g., physically or electronically) the industrial automation system 10, information related to security (e.g., security audit log data), and events associated with components of the industrial automation system 10 or software utilized to operate or control the components of the industrial automation system 10 (e.g., message logs, syslogs). Additionally, the data regarding the components of the industrial automation system 10 may include the log data or be indicative of the types of components within the industrial automation system 10, functions of components within the industrial automation system 10, the placement of components the industrial automation system 10 (e.g., a physical location within the factory 12), operating schedules of the components the industrial automation system 10, and the hierarchical levels of the industrial automation system 10.

Conversely, the computing devices 90 may send data 102B to the industrial automation system 10 (and database 80) utilizing the common data pipeline. For example, the computing devices 90 may send the data 102B to the cloud computing device 88, which may group the data 102B, characterize the data 102B (e.g., by applying metadata 104B to the data 102B), encrypt the data 102B, or a combination thereof before providing the data 102B to the edge computing device 86. The edge computing device 86 may receive the data 102B, decrypt the data 102B, and provide the data 102B to the industrial automation system 10, the industrial control system 22, the database 80, or a combination thereof.

The data 102B may include, but is not limited to, data resulting from analyzing the data 102A and updates for software that may be authored by an entity or organization in control of one or more of the computing devices 90. As an example, the computing devices 90 may process the data 102A to make various determinations regarding the data 102A. This may include making determinations regarding security within the industrial automation system 10 (e.g., based on analyzing audio data, video data, security audit log data or a combination thereof), diagnosing or troubleshooting errors or potential errors within the industrial automation system, maintenance operations recommended to be performed within the industrial automation system 10 or a portion thereof (e.g., on a particular component or within a particular hierarchical level of the industrial automation system 10), a combination thereof. As further examples, the data 102B may include telemetry data, network communication data, and data pertaining to alarms or events. For instance, based on analyzing the data 102A, the computing devices 90 may determine that an alarm should be triggered in the industrial automation system 10, whether a particular event occurred within the industrial automation system 10, or determine (e.g., diagnose) why an alarm or event occurred within the industrial automation system 10. Additionally, the data 102B may be data that is sent to alter the configuration of the edge computing device 86, to alter the configuration of the cloud computing device 88, or to add, remove, or configure one or more sources of the data 102A (e.g., one or more components of the industrial automation system 10).

Figure 7:
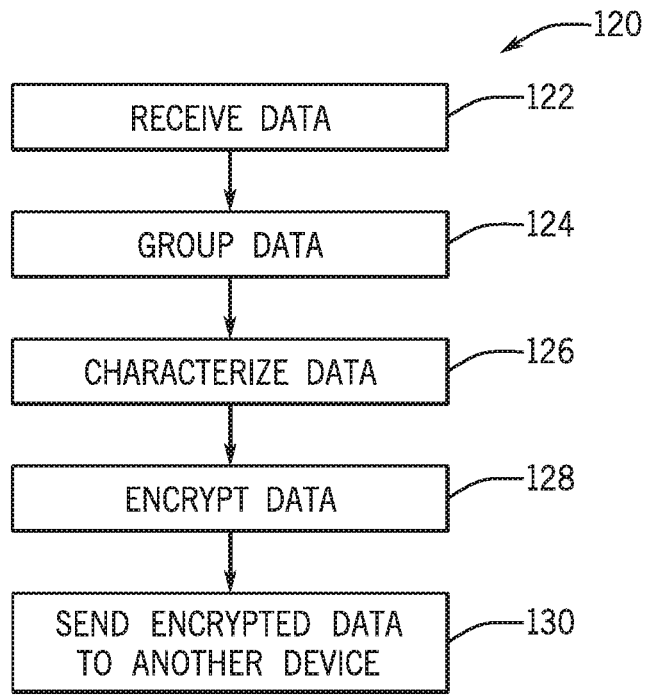
FIG. 7 illustrates a flow diagram of a process for communicating data within the data analysis system of FIG. 5 and the data communication system of FIG. 6, in accordance with an embodiment presented herein.

By utilizing the common data pipeline, the data 102A, 102B may be communicated between the computing devices 90 and industrial automation system 10 (and database 80) in an encrypted form and in which the communicated data may be grouped, characterized (e.g., tagged with metadata), or both, thereby enabling the data 102A, 102B to be communicated in a manner that is secure, enables receiving devices to understand the data regardless of the format of the data, and may reduce congestion over communication networks. To help describe how the data 102A, 102B may be shared using the common data pipeline, FIG. 7 is provided. In particular, FIG. 7 is a flow diagram of a process 120 for communicating data within the data analysis system 84 and data communication system 100. The process 120 may be performed by the edge computing device 86 (e.g., using data 102A) or the cloud computing device 88 (e.g., using data 102B) by processing circuitry (e.g. one or more processors included in the edge computing device 86 or the cloud computing device 88) executing computer-readable instructions stored on memory or storage of the edge computing device 86 or the cloud computing device 88. Additionally, the computing devices 90 may also perform any of the operations of the process 120 described below as being performed by the cloud computing device 88. Furthermore, in some embodiments, the operations of the process 120 may be performed in an order different than the order discussed below, operations of the process 120 may be omitted, or both. The process 120 generally includes receiving data (process block 122), grouping the received data (process block 124), characterizing the data (process block 126), encrypting the data (process block 128), and sending the encrypted data to another device (process block 130).

At process block 122, data is received. For instance, the edge computing device 86 may receive the data 102A from an industrial component 20 in the industrial automation system 10 (or database 80). As another example, the cloud computing device 88 may receive the data 102B from the computing devices 90. The data may include data from a number of industrial components 20 located in different hierarchical levels or locations within the industrial automation system 10. In some embodiments, the data may be requested from another industrial component 20, from an external computing device, or the like. Alternatively, the industrial component 20 may periodically send the data 102A according to a subscription service, an event being present (e.g., data above a threshold), or some other methodology.

At process block 124, the received data may be grouped or arranged, for instance, based on a type of the data, a component with which the data is associated, a hierarchical level with which the data is associated, or a combination thereof. For example, received data may be rearranged to group similar types of data together. More specifically, in the example of the edge computing device 86 receiving the data 102A, the edge computing device 86 may reorganize the data 102A to group log files together (which may even be sub-grouped based on the type of log file), group audio data together, group video data together, and group data regarding the industrial automation system 10 together. For example, data regarding the layout of the factory 12, hierarchical levels of organization of the industrial automation system 10, and information pertaining to the components of the industrial automation system or the operation thereof may be grouped. When grouping the data by component, the edge computing device 86 may rearrange received data packets so that data common to a particular component is grouped together. Similarly, the data for a hierarchical level may also be grouped together. For instance, data may be grouped by hierarchical level (e.g. a cell) and include the data for each component included within the hierarchical level. Within the grouped data, the data may be sub-grouped by component so that the data pertaining to each component is grouped together. As another example, data may also be grouped by hierarchical level and type. For instance, the data generated by, or associated with, components in a hierarchical level may be grouped. Within such groupings, the data may be further arranged by type. In such an example, energy consumption data for each component in a hierarchical level may be grouped together, and each other form of data for each of the components may be grouped together.

In the example of the cloud computing device 88 receiving the data 102B, the cloud computing device 88 may rearrange the data 102B based on the type of data or by the portion of the industrial automation system 10 to which the data 102B pertains, or a combination thereof. For instance, when grouping data by type, diagnostic data may be grouped together, potential or recommended maintenance operations may be grouped together, security determinations may be grouped together, and software updates may be grouped together. As another example, when arranging data based on the portion of the industrial automation system 10 to which the data 102B pertains, data associated with a specific component may be grouped together or data may be grouped based on the hierarchical levels of the industrial automation system 10. For example, portions of the data 102B pertaining to a particular component 20, cell 18, or area 16 may be grouped together.

In some embodiments, the grouping of the portions of the data 102A or the data 102B may be pre-defined according to a particular order or arrangement defined by the common data pipeline. That is, the data 102A or the data 102B may be organized such that packets that make up the data 102A or the data 102B are organized in a particular order (e.g., ordering packets of data by data type, a component with which the data is associated, a hierarchical level with which the data is associated, or a combination thereof). In this case, if datasets are not present for the data 102A or the data 102B, the respective packets may be null or include an indicator that data for that portion does not exist. For example, data packets may be reordered so that data for each component or type of data is organized together in a pre-defined order (e.g., based on an identifier associated with a component or type of data). When data for a component or type of data is missing, the grouped data may reflect that there is no data for that particular component or type of data. By organizing the data 102A and the data 102B in a consistent order, the various components 20 may extract or comprehend the data 102A or the data 102B in an efficient manner. Similarly, the cloud computing devices 90 may also access and interpret data associated with the industrial automation system 10 (e.g., data 102A) regardless of the source of the data 102A or a communication, a manufacturer of the components that generate the data 102A, formats of the data 102A, and communication protocols utilized by the components that generate the data 102A.

At process block 124, the data may be characterized. More specifically, the edge computing device 86 may analyze the data 102A and apply metadata 104A (e.g., data tags or headers) to portions of the data 102A to characterize the data 102A. Likewise, the cloud computing device 88 may analyze the data 102B and may apply metadata 104B (e.g., data tags or headers) to the data 102B to characterize the data 102B. In the example of the edge computing device 86 applying metadata 104A to the data 102A, the metadata 104A may be indicative of a particular context associated with a particular portion of the data 102A, such as a component, hierarchical level, factory, or combination thereof within the industrial automation system 10 with which the particular portion of the data 102A is associated. For instance, the metadata 104A may be indicative of an origin of the data 102A at several different levels. For example, portions of the data 102A associated with a particular component may be tagged with metadata 104A indicating the component as well as one or more hierarchical levels of the industrial automation system 10 in which the component is included (e.g., a particular cell, area, factory or combination thereof). The metadata 104A may be indicative of a type of the data 102A. For instance, each log file may be tagged with one or more data tags indicating that the log file is a log file and that the log file includes a particular type of log data. As another example, the metadata 104A may indicate that the data is video data, audio data, information about software (e.g., a version of software utilized by the industrial automation system 10 or a component thereof) or another type of data generated or collected by the industrial automation system 10 (including data generated or collected by the industrial control system 22).

Similarly, the cloud computing device 88 may apply the metadata 104B to the data 102B to indicate what type of data the data 102B is. For instance, the metadata 104B may be utilized to indicate that a particular portion of the data 102B relates to software (e.g., software updates), a particular type of analysis performed on the data 102B (e.g., security determinations, maintenance determinations, diagnostic operations, and the like), or a particular recommendation (e.g., a diagnostic or maintenance operation recommended to be performed based on analyzing the data 102B). Furthermore, the cloud computing device 88 may apply metadata 104B to indicate a particular hierarchical level or component associated with the data 102B. For instance, when sending data relating to the analysis of a particular component or a recommended action to be performed associated with the particular component, the cloud computing device 88 may include the metadata 104B to also indicate that the data 102B relates the particular component or hierarchical level in which the component is included. Likewise, when the data 102B relates to a hierarchical level that encompasses several components (e.g., a cell or area within a factory), the metadata 104B may also be applied to indicate one or more hierarchical levels to which the data pertains.

At process block 128, the data 102A, 102B is encrypted. In other words, data that has been packaged (e.g., grouped), characterized (e.g., tagged with metadata), or both may be encrypted by the edge computing device 86 and the cloud computing device 88. The data may be encrypted in accordance with one or several encryption or cryptographic algorithms or protocols, such as Transport Layer Security (TLS), Secure Sockets Layer (SSL), Triple Data Encryption Algorithm (TDEA), Advanced Encryption Standard (AES), or public key system (e.g., Rivest-Shamir-Adleman (RSA) system, elliptic-curve cryptography (ECC)). Furthermore, the data 102A, 102B may be encrypted based on hierarchical levels, components, or a type of data. For example, data packets of the data 102A, 102B may be encrypted in an order (e.g., a pre-defined or random order) that is determined based on hierarchical levels, components, or a type of data. As such, the data 102A, 102B may be encrypted based on an order or arrangement of the data 102A, 102B (e.g., as grouped or reordered as described above with respect to process block 124).

At process block 130, the encrypted data is sent to another device. For example, the edge computing device 86 may send the data 102A to the cloud computing device 88. As another example, the cloud computing device 88 may send the data 102B to the edge computing device 86. The data 102A and data 102B may be sent using an Internet connection, such as an Internet connection made via a wired network or wireless network. Furthermore the encrypted data may include a cryptographic key or other type of data that may enable devices received the encrypted data to decrypt the received data.

Figure 8:
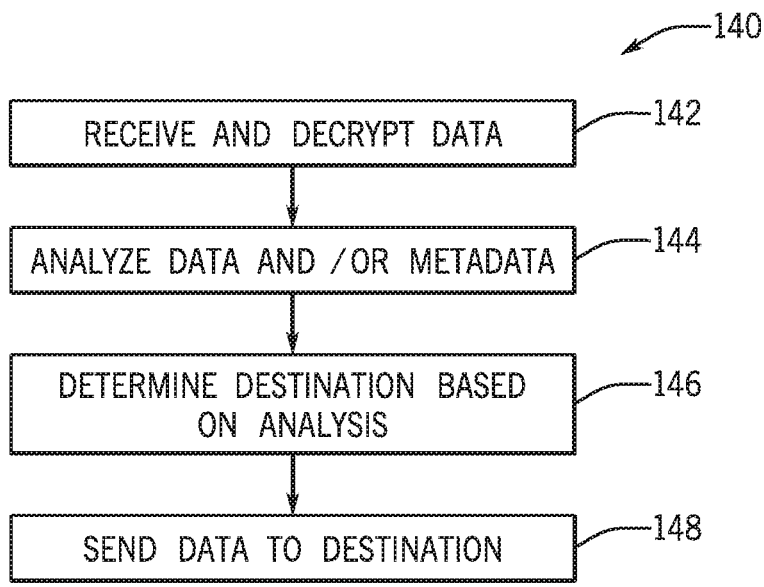
FIG. 8 illustrates a flow diagram of a process for processing data received with the common data pipeline of FIG. 5 and FIG. 6, in accordance with an embodiment presented herein.

Having discussed how data can be packaged, characterized, encrypted, and sent using the common data pipeline, the discussion will now turn to FIG. 8, which is a flow diagram of a process 140 for processing data received via the common data pipeline. The process 140 may be performed by the edge computing device 86 (e.g., using data 102B) or the cloud computing device 88 (e.g., using data 102A) by processing circuitry (e.g. one or more processors included in the edge computing device 86 or the cloud computing device 88) executing computer-readable instructions stored on memory or storage of the edge computing device 86 or the cloud computing device 88. Additionally, the computing devices 90 may also perform any of the operations of the process 140 described below as being performed by the cloud computing device 88. Furthermore, in some embodiments, the operations of the process 140 may be performed in an order different than the order discussed below, operations of the process 140 may be omitted, or both. The process 140 generally includes receiving and decrypting data (process block 142), analyzing the received data, metadata included with the data, or both (process block 144), determining a destination for the data based on the analysis performed at process block 142 (process block 146), and sending the data to the determined location (process block 148).

At process block 142, data may be received and decrypted. For example, the edge computing device 86 may receive data 102B sent by the cloud computing device 88. As another example, the cloud computing device 88 may receive data 102A sent by the edge computing device 86. Additionally, the edge computing device 86 and cloud computing device 88 may decrypt the received data in accordance with the encryption or cryptographic algorithms or protocols discussed above with respect to process block 130 of FIG. 7.

At process block 144, the received data, metadata included with the data, or both the data and metadata may be analyzed. For instance, in the example of the edge computing device 86 receiving data 102B (that includes metadata 104B) from the cloud computing device 88, the edge computing device 86 may analyze the data 102B, the metadata 104B or both. The analysis may include determining to which component, hierarchical level, factory, or combination thereof the data 102B pertains. The analysis may also include determining what type of the data the data 102B, which may be indicated by the metadata 104B included with the data, by a filename extension of the data 102B, or both.

In the example of the cloud computing device 88 receiving the data from the edge computing device 86, the cloud computing device 88 may analyze the data 102A, metadata 104A, or both to make various determinations regarding the data. For example, the cloud computing device 88 may determine a context for the data 102A based on the metadata 104A, which may indicate a type of the data, which portion (e.g., a specific component, hierarchical level, or factory) of the industrial automation system 10 the data 102A pertains to, or both. As another example, the cloud computing device 88 may determine that a new device or component has been added to the industrial automation system 10. For instance, metadata 104A may be indicative of a portion of the data 102A pertaining to a device or component of that the cloud computing device 88 does not recognize as being included in the industrial automation system 10. Based on the metadata 104A, the cloud computing device 90 may determine the device or component has been added to the industrial automation system, one or more contexts (e.g., hierarchical levels) associated with the device or component, and one or more functions performed by the device or component. Thus, while the data 102A itself may not include any context for what the data 102A is or what portion of the industrial automation system 10 the data is associated with, the cloud computing device 88 may nevertheless be able to determine the context for the data by analyzing the metadata 104A (e.g., data tags) previously applied to the data 102A. Accordingly, by utilizing metadata that is included with data before it is communicated, the cloud computing device 88 is able to receive data from several factories (e.g., factory 12 and factories 14) and determine a particular component in a particular factory that the data 102A pertains to even in cases when the cloud computing device 88 may otherwise be unable to make such a determination (e.g., in cases where different communication protocols are used, file extensions are not recognized, or the like).

At process block 146, a destination for the received data may be determined based on analyzing the data, metadata included with the data, or both. For example, in the case of the edge computing device 86 receiving the data 102B, the edge computing device 86 may determine whether to provide the received data to the database 80, a particular portion of the industrial automation system 10, or both. For example, the data 102B may include a header (e.g., previously added as metadata 104B) indicating where the data 102B should be directed. As another example, the edge computing device 86 may provide the data 102B to a controller (e.g., a controller included in the industrial control system 22) that is responsible for controlling a particular component or hierarchical level within the industrial automation system 10 that is indicated by the metadata 104B.

In the case of the cloud computing device 88 receiving the data 102A, the cloud computing device 88 may determine to which particular computing device of the computing devices 90 the data 102A should be provided. Such a determination may be made by analyzing a header that may have been previously applied to the data 102A as metadata 104A by the edge computing device 86. The computing devices 90 may include computing devices that are associated with different entities. For example, the computing devices 90 may belong to or be associated with an entities that provide different various services for the industrial automation system, such as, but not limited to security services, data analysis or management services, and maintenance services. The metadata 104A may indicate a particular service or entity. In such a case, the cloud computing device may provide the data 102A to the computing device associated with the indicated entity or service. Furthermore, it should be noted that different portions of the data 102A, 102B may pertain to different components or services. The edge computing device 86 and cloud computing device 88 may determine different destinations for the various portions of the data 102A, 102B.

At process block 148, the data may be sent to the determined destination. More specifically, the edge computing device 86 may provide the data 102B to the database 80, a particular portion of the industrial automation system 10, or both, based on the analysis performed at process block 146. Similarly, the cloud computing device 88 may send the data 102A to a particular computing device 90 based on the determination performed at process block 146. Additionally, in cases in which different portions of the data 102A, 102B are determined to be sent to different locations, the edge computing device 86 and the cloud computing device 88 may provide the respective portions of data to the respective destinations determined for each of the portions of the data 102A, 102B.

By utilizing the common data pipeline in accordance with the process 120 and the process 140, data may be communicated between the industrial automation system 10 and the computing devices 90 in a secure (e.g., encrypted) manner in which the data is organized and characterized. As such, a device receiving the data is able to analyze the data and provide the data to another device regardless of the type of device associated with the data or from which the data originates, the manufacturer of such devices, or communication protocols that such devices may otherwise use. Furthermore, because devices outside of automation systems are able to determine one or more contexts associated with data received from an automation system (e.g., industrial automation system 10), the external devices (e.g., computing devices 90) may be able to perform enhanced data analysis specific to a particular portion (e.g., factory, hierarchical level, or component) included in the industrial automation system 10. For example, because the computing devices 90 are better able to understand the relationship between different devices included in the industrial automation system 10 and how received data relates to the industrial automation system 10 (or a particular portion thereof), the computing devices 90 may be utilized to perform more specific and accurate analyses of data provided by the industrial automation system 10. Additionally, because the computing devices 90 are better able to understand the relationship between different devices included in the industrial automation system 10 and how received data relates to the industrial automation system 10 (or a particular portion thereof), the computing devices 90 may be able to further contextualize data or enhance data packages (e.g., groups of data packets) generated and provided by the computing devices 90 (e.g., data packages included in the data 102B).

Moreover, using the techniques described herein, external devices may be able to request and receive data specific to particular devices or portions of the industrial automation system 10. For example, because the computing devices 90 are able to determine the context(s) associated with received data, the computing devices 90 can determine that received data is a particular type of data associated with a particular component, hierarchical level, factory, or combination thereof. Accordingly, the computing devices 90 may request specific types of data, data pertaining to a specific portion of the industrial automation system 10, or both. Somewhat similarly, the computing devices 90 may be able to subscribe to data channels specific to a particular type of data or a specific component, hierarchical level, or factory within the industrial automation system, thereby enabling the computing devices 90 to receive specific data.

Furthermore, by grouping data before sending the data, the techniques disclosed herein my reduce traffic over networks, thereby reducing the occurrence of network congestion. For example, the edge computing device 86 and cloud computing device 88 may aggregate data before sending it. In other words, the edge computing device 86 and cloud computing device 88 may limit use of communication networks for example, because the edge computing device 86 and cloud computing device 88 may not transmit data until the data has been grouped. Accordingly, because the edge computing device 86 and cloud computing device 88 may less constantly utilize networks to send data, the techniques described herein may reduce network congestion.

Additionally, because the data 102A, 102B is arranged in a particular arrangement (e.g., grouped as discussed above with respect to FIG. 7), the edge computing device 86 and cloud computing device 88 may be able to more quickly aggregate received data, which may enable the received data to be analyzed more quickly. For example, because similar data may be organized together in data before it is transmitted from one device to another, fewer processing resources may be utilized by the receiving device when analyzing the received data or making determinations regarding the received data. Moreover, while data is being aggregated (e.g., grouped) or after data has been aggregated, the edge computing device 86 and cloud computing device 88 may send one or more portions of the aggregated data to components of the industrial automation system 10 or one or more computing devices 90 that subscribe to the data (e.g., a data feed that includes any updates regarding particular types of the data or data associated with a particular component or hierarchical level). Thus, the edge computing device 86 may coordinate data traffic across the industrial automation system 10 to limit network use while still being able to receive data from the devices included in the industrial automation system 10.

In some embodiments, one or more of the computing devices 90 may be included as part of the cloud computing device 88 or the cloud computing device 88 may be utilized to encrypt data, decrypt data, and analyze data. As such, while the process 120 and the process 140 are described above as being performed utilizing data originating from the industrial automation system 10 (e.g., in an embodiment of the process 140 illustrated in FIG. 8) as well as data to be sent to the computing devices 90 or originating from the computing devices 90 (e.g., in embodiments of the process 120 illustrated in FIG. 7), the cloud computing device 88 may perform the various operations discussed above with respect to the computing devices 90. For example, the cloud computing device 88 may receive the data 102A, decrypt the data 102A, analyze the data 102A, generate the data 102B, encrypt the data 102B, and send the data 102B to the edge computing device 86.

Additionally, it should be noted that the data 102B may enable a user to remotely access the industrial automation system 10 or components thereof, for example, to perform troubleshooting or to configure the industrial automation system 10 or components thereof. Accordingly, while the data 102A may include data generated by industrial automation system 10, the data 102B may be data sent regarding an analysis of the data 102A or data sent to gain access to the industrial automation system 10 or components thereof. For example, the cloud computing device 88 or computing devices 90 may receive and decrypt the data 102A, analyze the data 102, and send the data 102B to gain remote access to the industrial automation system 10 (or components thereof) and make changes to the industrial automation system 10 or components thereof.

Furthermore, while hierarchical levels of the industrial automation system 10 discussed above include factories (e.g., factory 12 and factories 14) include areas 16, cells 18, and components 20, in other embodiments, different hierarchical levels may be utilized, and the amount of hierarchical levels utilized may also differ. For example, in another embodiment, the industrial automation 10 may include factory-level hierarchical levels, area-level hierarchical levels, location-level hierarchical levels, machine-level hierarchical levels, line-level hierarchical levels, panel-level hierarchical levels, device-level hierarchical levels, component-level hierarchical levels, or any combination thereof. Factory-level hierarchical levels may include individual factories, such as the factory 12 or one of the factories 14. Area-level hierarchical levels may correspond to areas 16. Location-level hierarchical levels may be physical areas related to physical portions (e.g., rooms, floors, or other subsections) of a factory. In some cases, location-level hierarchical levels may include components associated with a particular portion of a process associated with an area 16. Accordingly, the location-level hierarchical levels may corresponds to cells 18. Machine-level hierarchical levels may include individual machines that are utilized to perform a function within the industrial automation system 10, and component or device-level hierarchical levels may include devices or components included in a machine-level hierarchical level or devices or components that are otherwise not included in machine-level hierarchical level. Line-level hierarchical levels may include machines, devices, and components that are associated with a particular assembly line within a factory. Panel-level hierarchical levels may include devices, components, or machines that are associated with a particular panel, such as a particular HMI or operator interface that is physically closest to the devices, components, or machines or which an operator may use to control or interact with the devices, components, or machines. Accordingly, operations discussed above relating to hierarchical levels, such as grouping data by hierarchical level, may be performed utilized these hierarchical levels in addition to, or as an alternative to, utilizing factory, area, cell, and component-level hierarchical levels.

Customer Support and Maintenance System

When an asset or item of equipment in a facility (e.g., a component within the industrial automation system 10) malfunctions, experiences issues, or otherwise encounters problems, customers may submit a service inquiry to a customer support and maintenance (CSM) system. In some embodiments, the CSM system may be implemented by the cloud computing device 88. For example, the cloud computing device 88 may include the CSM system or implement the CSM system by executing computer-readable instructions. Equipment manufacturers may use the CSM system to organize service inquiries received from customers. The CSM system may enable agents to keep track of service inquiries and other customer-care related issues. For example, the CSM system may generate a service ticket to represent the service inquiry and may assign the service ticket to an agent of the CSM system to work on and resolve issues associated with the service inquiry. In some instances, the CSM system may receive service inquiries with incomplete and/or inconsistent information that may prevent an agent from resolving the issue or may result in an incorrect resolution. For example, the service inquiry may identify a particular asset associated with an industrial plant system, such as industrial automation system 10, but may not specify a function (e.g., job) performed by the asset, relationships to other assets within the industrial plant system, connections to other assets within the industrial plant system, a maintenance history for the asset, or the like. For example, the CSM system may receive and/or retrieve different types of data (e.g., telemetry data, inventory data) and the associated metadata. Different departments within the equipment manufacturer may have additional data associated with the asset that may be useful in assessing and diagnosing issues associated with service inquiries and may assist in resolving service inquiries. As a result, it may be helpful to integrate additional data from different departments associated with the asset manufacturer. The asset may also be capable of providing additional data associated with operation of the asset. The CSM system may receive additional data from any number of sources and may analyze the data to assess and diagnose issues associated with a service inquiry.

Figure 9:
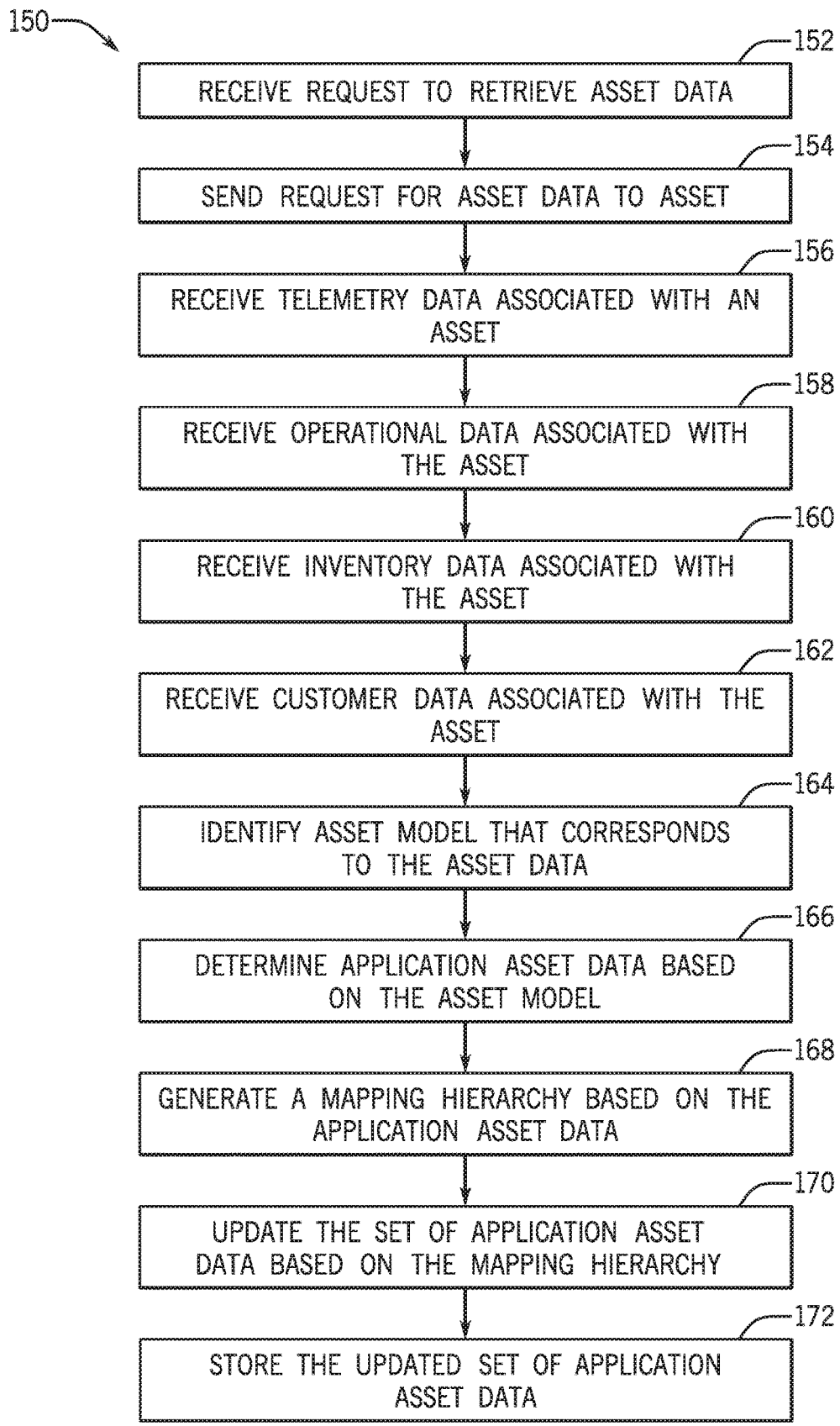
FIG. 9 is a flowchart corresponding to asset data retrieval operations associated with a customer service and maintenance (CSM) system, in accordance with an embodiment.

With the foregoing in mind, FIG. 9 is a flowchart of a method 150 performed by a CSM system to retrieve application asset data (e.g., from the database 80 and/or an asset associated with the service inquiry). Although the method 150 is described below as performed by a CSM system, it should be noted that the method 150 may be performed by any suitable processor that processes asset data, such as the cloud computing device 88. Furthermore, certain described steps may be implemented by executing instructions stored in a memory, using any suitable processing circuitry, such as processing circuitry included in a CSM system or the cloud computing device 88. In some embodiments, the memory may include one or more tangible, non-transitory computer-readable media that store instructions executable by any suitable processing circuitry and/or data to be processed by any suitable processing circuitry. For example, the memory may include random access memory (RAM), read only memory (ROM), rewritable non-volatile memory, such as flash memory, hard drives, optical discs, and/or the like. Moreover, although the method 150 is described in a particular order below, it should be noted that the method 150 may be performed in any suitable order.

At process block 152, the CSM system may receive a request to retrieve asset data associated with an asset. For example, the request may be received from a computing device 90 in response to a service inquiry associated with the asset. The computing device 90 may include a graphical user interface (GUI) and/or a display configured to receive an input from a technician. The service inquiry may include one or more data fields containing information associated with the asset, such that a technician may input information associated with an asset and fill a service inquiry form. For example, the service inquiry may include an operating issue data field, a customer name data field, an asset type data field, or any other suitable data field containing information associated with the asset. In certain embodiments, the CSM system may generate the request to retrieve asset data in response to receiving a service inquiry associated with an asset. For example, the CSM system may determine the service inquiry includes one or more missing data fields, such as an operational mode of the asset, one or more relationships to additional assets, a physical location of the asset in an industrial plant system, or any other suitable data associated with the asset.

After the request is received, the CSM system may send the request to the corresponding asset (process block 154). In certain embodiments, the CSM system may be configured to act as a passthrough between a requesting device and the asset associated with the asset data. For example, the CSM system (e.g., implemented by the cloud computing device 88) may be communicatively coupled to the asset (e.g., a component of the industrial automation system 10) and the requesting device (e.g., computing device 90) and utilize the common data pipeline 92 to communicate data therebetween. In some embodiments, the CSM system may also be communicatively coupled to a communication network of the industrial automation system 10. One or more components of the communication network may be communicatively coupled to the asset and may be configured to act as a passthrough between the CSM system and the asset. For example, as discussed above, the industrial control system 22 and edge computing device 86 may serve as intermediaries between components (e.g., automation devices) of the industrial automation system 10 and the cloud computing device 88.

In response to requesting the asset data, at process block 156, the CSM system may receive telemetry data obtained by measuring and/or sensing real-time operational parameters (e.g., motor frequency, voltage, current, rotor speed, energy consumption, operating duration, network communication data, number of widgets produced by the asset and/or a process associated with the asset, rate of widget production, and the like) for an asset. In certain embodiments, the telemetry data may be transmitted by the asset in response to receiving the request. For example, one or more data packets transmitted by the asset may include a signal and/or a signature (e.g., metadata 104A) embedded therein. In some embodiments, the data packets may be routed between the asset and the CSM system by one or more components (e.g., gateway, router, edge computing device 86) of a communication network and/or via the common data pipeline 92.

The CSM system may make various determinations using the telemetry data. For instance, the CSM system may determine a location of the asset in the communication network based on the telemetry data. More specifically, components of the communication network may embed any number of signatures within one or more data packets routed between the asset and the CSM system. In certain embodiments, the CSM system may analyze the signatures embedded within the one or more data packets to determine a routing of the one or more data packets from the asset to the CSM system. For example, a signature may include a time stamp indicative of when the component embedded the signature within the data packet. As such, the CSM system may determine an order that the data packet passes from the asset through the components of the communication network and to the CSM system based on the timestamps of the signatures and determine a location of the asset relative to other components of the communication network. Additionally or alternatively, the signatures may be embedded in a chronological order within a data packet. The CSM system may determine a first signature embedded within the data packet based on the order and/or the timestamps. As a result, the CSM system may determine a first component in the communication network associated with a first signature in the chronological order. In certain embodiments, the CSM system may determine a physical location of the asset based on the first component. For example, the CSM system may determine a location of the first component and/or may receive the location from the first component. As such, the CSM system may determine the physical location of the asset based on the location of the first component. For example, the CSM system may determine the physical location of the asset is within a communication range of the first component. In some embodiments, the CSM system may determine how production is affected based on the telemetry data. For example, the CSM system may determine a number of lost widget production based on a rate of widget production associated with the asset and an expected downtime for repair and/or maintenance of the asset.

Additionally or alternatively, the signal and/or the signature may be indicative of one or more relationships between the asset and one or more additional assets. For example, the relationship may be indicative of a communication protocol between the asset and an additional asset, an electrical connection between the asset and the additional asset, an order of operations performed by one or more assets in a manufacturing process, and/or any other suitable relationship. For example, a first asset may be a conveyor capable of moving parts from a manufacturing asset to a packaging asset. In certain embodiments, the relationship may be indicative of the location of the conveyor between the manufacturing asset and the packaging asset.

At process block 158, the CSM system may receive operational data (e.g., operational statuses) associated with operational parameters of the asset including voltage, current, temperature, electrical load, energy consumption, operating status operating durations of the asset (e.g., an amount of time the asset has had a particular operating status), operating times of the asset (e.g., historically or according to a schedule), a type of the asset, and the like. For example, the asset or a controller associated with the asset (e.g., a controller included in the industrial control system 22) may transmit operational data associated with the asset through an industrial automation network and/or via the common data pipeline 92 to the CSM system in response to receiving the request for asset data. In some embodiments, the operational data may include associated metadata, such as a time stamp, a location of the asset within the facility, a location of the asset within an industrial plant system, such as industrial automation system 10, and the like. In certain embodiments, the operational data may include hierarchical data such as a hierarchical level of the asset within an industrial plant system.

At process block 160, the CSM system may receive inventory data associated with the asset. For example, the CSM system may receive inventory data from a database (e.g., database 80) associated with a different department than the customer service and maintenance department associated with the CSM system. In some embodiments, the inventory data may include orders of parts, installation of parts, and/or replacement of parts. For example, the CSM system may receive inventory data indicative of a number of times a particular part of an asset has been replaced. In some embodiments, the inventory data may include a listing of all parts associated with the asset, a number of parts associated with the asset, and the like. Additionally or alternatively, the inventory data may include an order date for a corresponding part, an installation date for a corresponding part, an asset associated with the part, or any other suitable inventory data. In some embodiments, the inventory data may include associated metadata (e.g., metadata 104A).

At process block 162, the CSM system may receive customer data associated with the asset. In certain embodiments, the customer data may be retrieved from a database associated with a different department of the asset manufacturer. Additionally or alternatively, customer data may be provided by the asset and/or a component of a communication network associated with the asset (e.g., the edge computing device 86). The customer data may include a customer name, an industry associated with the customer, a location of a facility associated with the asset, a location of the asset within the facility, an industrial (e.g., packaging, manufacturing) process associated with the customer and/or the asset, and/or a location of the asset within an industrial plant system.

At process block 164, the CSM system may identify an asset model that corresponds to the asset data. A set of asset models may be stored in a database, such as database 80, and the CSM system may retrieve the set of asset models. Each asset model may include asset type information, such as a model number or name of an asset and/or a product line associated with an asset. Each asset model may be associated with a particular job performed by the asset. For instance, in certain embodiments, the asset model may include a job performed by the asset, such as one or more steps of a manufacturing process. For example, the asset model may include a packaging step, an assembly step, and/or any other suitable step of a manufacturing process as described herein. In some embodiments, the asset model may include time durations associated with the job. For example, the asset model may include a typical operating time duration for one or more steps of a manufacturing process. Additionally or alternatively, the asset model may include parts data associated with the asset and/or the job. For example, the asset model may include information associated with a wear life of a part of the asset (e.g., an expected amount of time before the part should be maintenance, repaired, or replaced). In certain embodiments, the wear life of the part may vary based on a particular job being performed by the asset. Additionally or alternatively, each asset model may include a set of baseline operational parameters (e.g., electrical load, current, voltage, energy consumption, and so forth) associated with the corresponding job performed by the asset. For example, the set of baseline operational parameters may include a range of values for each operational parameter. As such, the CSM system may compare the asset data to the set of baseline operational parameters to determine a particular job being performed by the asset. The CSM system may select an asset model corresponding to the asset data based a comparison between the operational data associated with the asset and the baseline operational parameters. For example, the CSM system may determine whether the operational data falls within a range of a corresponding baseline operational parameter. In certain embodiments, the CSM system may identify and select an asset model based on a comparison between the inventory data and an expected lifecycle of a part associated with a particular job. An expected lifecycle may be a total expected operational time before breakdown for an associated part. In certain embodiments, the expected lifecycle may include any number of threshold percentage lifecycles associated with a part. For example, a fifty percent lifecycle may be a total operational time at which fifty percent of a particular part would be expected to break down, a seventy five percent lifecycle may be a total operational time at which seventy five percent of a particular part would be expected to break down, and the like. In certain embodiments, the asset model may include a set of instructions to properly shut off and prevent further startup of the asset prior to completion of a set of maintenance actions (e.g., lock out/tag out procedure).

The CSM system may generate a set of asset data based on the received telemetry data, operational data, inventory data, customer data, and/or any other suitable data associated with the asset. In some embodiments, the CSM system may store the set of asset data in a memory. Additionally or alternatively, the set of asset data may be published to a virtual ledger, such as a blockchain. The virtual ledger may include a plurality of encoded blocks that represent the set of asset data. Each block may be recorded in chronological order and encoded or hashed to incorporate data in blocks that come before it. The CSM system may determine an asset type based on the set of asset data and may retrieve a set of asset models based on the determined asset type. For example, the CSM system may determine the asset type is a power converter of an industrial plant system and may retrieve a set of asset models associated with power converters. The CSM system may compare the set of asset data to the set of asset models to identify an asset model corresponding to the asset data. For example, the CSM system may compare parts orders with wear life of a particular part of an asset, such that parts orders of a particular part may be within a threshold time of an expected wear life of the particular part. As such, the CSM system may determine how often a particular part is replaced and compare the part replacement with an expected lifecycle for the particular part, such that the CSM system may select an asset model based on the comparison. In certain embodiments, the CSM system may analyze how often and/or how many times a particular part is replaced and may compare that to an expected lifecycle of the part and/or the operational time of the asset. In some embodiments, the CSM system may determine an expected number of times one or more parts are replaced based on the expected lifecycle of the corresponding part and the total operational time associated with the asset.

At process block 166, the CSM system may determine application asset data based on the asset model. The application asset data may be asset data corresponding to a particular job (e.g., task) performed by the asset. In certain embodiments, the application asset data may include a job performed by the asset. For example, the CSM system may determine a job being performed by the asset by comparing the number of times a particular part is replaced to an expected number of times based on the expected lifecycle of the part and the total operational time of the asset. In some embodiments, the CSM system may determine a type of asset based on operational parameters of the asset (e.g., electrical load, current, voltage, energy consumption, and so forth). For example, the CSM system may determine one or more operational parameters fall within an expected range of values for a particular type of asset. Additionally or alternatively, the CSM system may determine a particular model of asset based on operational parameters of the asset data. For example, the CSM system may determine one or more operational parameters fall within an expected range of values for a particular model of asset.

At process block 168, the CSM system may generate a mapping hierarchy based on the application asset data. The mapping hierarchy may be a hierarchical organization of an industrial plant system, such as industrial automation system 10, and may indicate a location of any number of assets, relationships (e.g., connections) between assets, and/or ranking of any number of assets within the industrial plant system. In certain embodiments, the CSM system may utilize the mapping hierarchy to determine additional asset data associated with the asset. For example, the CSM system may analyze the mapping hierarchy to determine connections between the associated asset and other assets on the plant floor. As such, the CSM system may analyze the connections to determine a particular job or task being performed by the associated asset. In certain embodiments, the mapping hierarchy may include a representation and/or a visualization of a plant floor. The CSM system may identify a physical location of the asset according to the mapping hierarchy. The mapping hierarchy may identify assets as subordinates of one or more other assets. Additionally or alternatively, the mapping hierarchy may include International Society of Automation (ISA) 88 standard hierarchy model or ISA-95 standard hierarchy model. The CSM system may retrieve an industrial plant system analysis from a database, and the industrial plant system analysis may provide information regarding one or more assets and conditions (e.g., statuses, wear lives) of the one or more assets. In certain embodiments, the industrial plant system analysis may include one or more assets associated with the industrial plant system, a layout of the one or more assets of the industrial plant system, a maintenance status of the one or more assets, a repair status of the one or more assets, and/or an inventory status of the one or more assets. Additionally or alternatively, the industrial plant system analysis may include an environmental condition associated with one or more assets, a protection condition (e.g., voltage protection) associated with one or more assets, a risk condition associated with one or more assets (e.g., lifetime expectancy), a wiring condition, a grounding condition, a ventilation condition associated with in industrial plant system, and the like.

At process block 170, the CSM system may update the set of application asset data based on the mapping hierarchy. For example, the CSM system may update the application asset data with any information associated with the mapping hierarchy. In other words, the hierarchical relationships of assets to another may be reflected in the set of asset of data. For instance, a component level, cell level, area, and factory of the industrial automation system 10 for each of the assets may be indicated in the set of application asset data.

At process block 172, the CSM system may store the updated set of application asset data. For example, the CSM system may store the updated set of application asset data in a database, such as database 80, associated with the CSM system. In certain embodiments, the updated set of application asset data may be published to a virtual ledger, such as a blockchain. The virtual ledger may include a plurality of encoded blocks that represent the application asset data. Each block may be recorded in chronological order and encoded or hashed to incorporate data in blocks that come before it. Accordingly, the CSM system may aggregate asset data and the database 80 may store the asset data for later retrieval when a service inquiry is received regarding the asset or any other asset associated with the same industrial plant system, such as industrial automation system 10. As such, the CSM system may retrieve additional information and asset data when a service inquiry is received to assist in diagnosing issues associated with an associated asset. Additionally or alternatively, the CSM system may log a time stamp associated with the updated set of application asset data and the time stamp may be indicative of when the application asset data was updated, when the asset data was retrieved by the CSM system, when the application asset data was stored, and the like.

When a service inquiry is received, the CSM system may retrieve stored application asset data in response. Equipment manufacturers may request verification of the application asset data. Different customer employees may provide differing levels of verification for the application asset data. For example, a plant manager may be able to verify an entire mapping of the industrial plant system, while a plant engineer may only be able to verify a particular asset. Verification may ensure accurate application asset data. As a result, the verified application asset data may assist the CSM system in producing more accurate assessments and/or correctly diagnosing issues corresponding to service inquiries.

Figure 10:
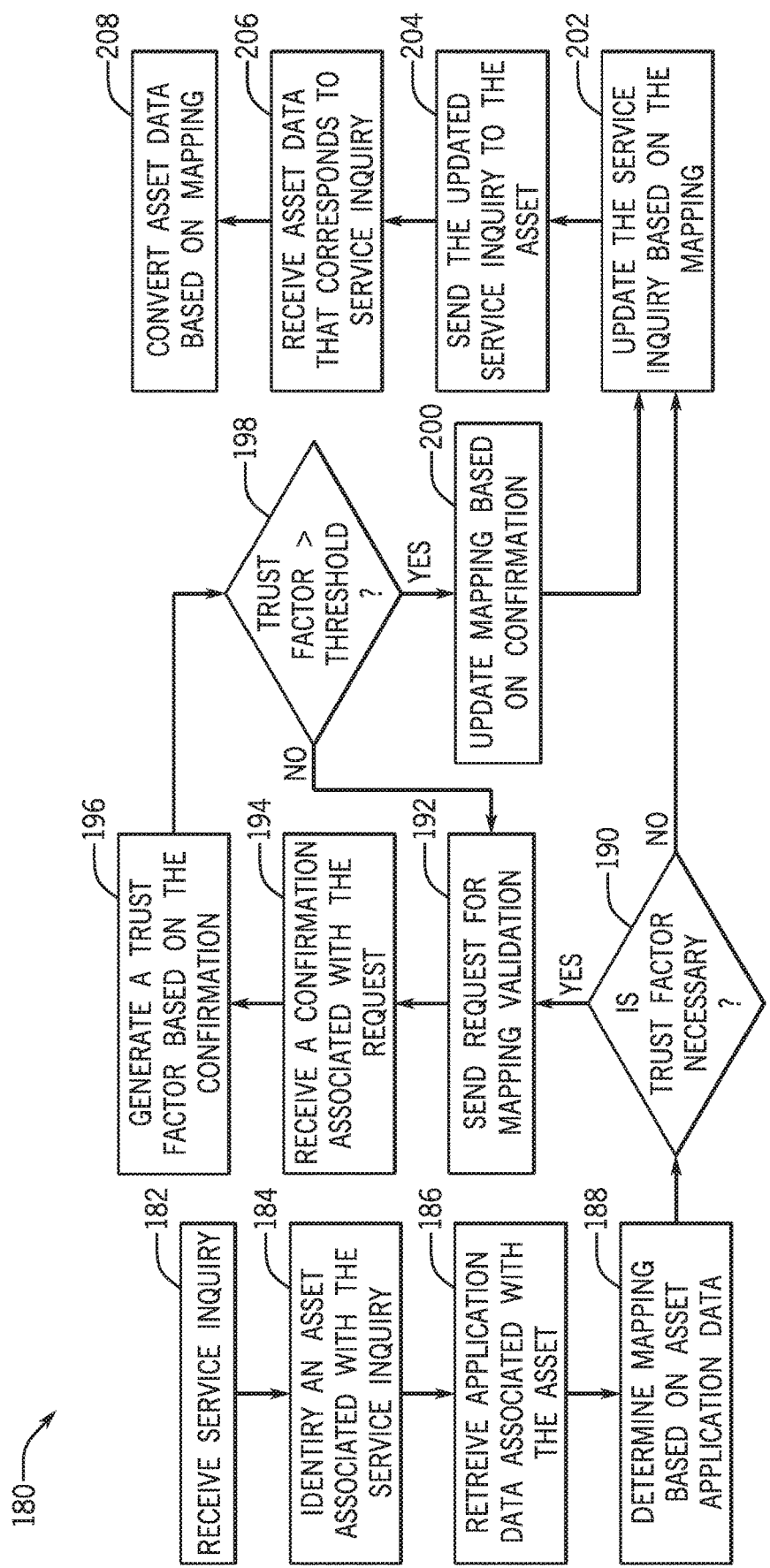
FIG. 10 is a flowchart corresponding to updating service inquiries with retrieved asset data with a CSM system, in accordance with an embodiment.

Keeping the foregoing in mind, FIG. 10 is a flowchart of a method 180 performed by a CSM system to verify and/or update application asset data. Although the method 180 is described below as performed by a CSM system, it should be noted that the method 180 may be performed by any suitable processor that processes asset data. Furthermore, certain described steps may be implemented by executing instructions stored in a memory, using any suitable processing circuitry, such as a CSM system implemented by the cloud computing device 88. In some embodiments, the memory may include one or more tangible, non-transitory computer-readable media that store instructions executable by any suitable processing circuitry and/or data to be processed by any suitable processing circuitry. For example, the memory may include random access memory (RAM), read only memory (ROM), rewritable non-volatile memory, such as flash memory, hard drives, optical discs, and/or the like. Moreover, although the following description of the method 180 is described in a particular order, it should be noted that the method 180 may be performed in any suitable order.

At process block 182, the CSM system may receive a service inquiry associated with an asset. In some embodiments, the service inquiry may be received from a customer. The CSM system may generate a ticket in response to receiving the service inquiry and may assign the ticket to an agent of the CSM system. In certain embodiments, the agent may be a virtual agent of the CSM system. The CSM system may be communicatively coupled to a communication network associated with the customer and/or the asset. In some embodiments, the asset may generate and transmit the service inquiry in response to detecting an issue. For example, the asset may monitor operational parameters and generate the service inquiry in response to one or more of the operational parameters exceeding one or more parameter thresholds. Additionally or alternatively, one or more components of a communication network communicatively coupled to the asset may monitor operational parameters associated with the asset and may generate the service inquiry. In certain embodiments, the CSM system may monitor operational parameters in response to receipt of the service inquiry. For example, the CSM system may transmit a request to access operational parameters to the asset and/or to one or more components of the communication network. In response, the asset and/or one or more components of the communication network may transmit, dynamically update, and/or periodically update the CSM system with operational parameters of the asset.

At process block 184, the CSM system may identify an asset associated with the service inquiry. In certain embodiments, the service inquiry may include one or more data fields completed by the customer. The service inquiry may include information indicative of an asset. For example, the service inquiry may include an asset type data field, an asset model data field, or the like. In certain embodiments, a graphical user interface (GUI) of software or an application used to generate the service inquiry may include a drop-down menu for selecting an asset type and/or an asset model.

At process block 186, the CSM system may retrieve application asset data associated with the identified asset. In some embodiments, the CSM system may retrieve the application asset data from a memory associated with the CSM system and/or a distributed ledger. Additionally or alternatively, the CSM system may determine the application asset data, as described in the method 150 in FIG. 9. In certain embodiments, the application asset data may include inventory data, customer data, telemetry data, operational data, and the like.

At process block 188, the CSM system may determine a mapping hierarchy based on the application asset data. In some embodiments, the CSM system may analyze relationships between the asset and one or more other assets associated with an industrial plant system. For example, the CSM system may determine the asset is communicatively coupled, electrically coupled, and shares a power source with one or more other assets. In certain embodiments, the CSM system may receive telemetry data associated with a communication network communicatively coupled to the asset. The telemetry data may include one or more signatures indicative of one or more assets associated with an industrial plant system. In certain embodiments, the CSM system may determine a location of the one or more assets, as described above with reference to FIG. 9. In certain embodiments, the mapping hierarchy may include a representation and/or a visualization of a plant floor associated with an industrial plant system. The CSM system may identify a physical location of the asset according to the mapping hierarchy. The mapping hierarchy may identify assets as subordinates of one or more other assets. Additionally or alternatively, the mapping hierarchy may include International Society of Automation (ISA) 88 standard hierarchy model or ISA-95 standard hierarchy model. The CSM system may retrieve an industrial plant system analysis from a database and the industrial plant system analysis may provide information regarding one or more assets and conditions of the one or more assets. In certain embodiments, the industrial plant system analysis may include one or more assets associated with the industrial plant system, a layout of the one or more assets of the industrial plant system, a maintenance status of the one or more assets, a repair status of the one or more assets, and/or an inventory status of the one or more assets. Additionally or alternatively, the industrial plant system analysis may include an environmental condition associated with one or more assets, a protection condition (e.g., voltage protection) associated with one or more assets, a risk condition associated with one or more assets (e.g., lifetime expectancy), a wiring condition, a grounding condition, a ventilation condition associated within industrial plant system, and the like. In certain embodiments, the mapping hierarchy may be previously determined, such as by the CSM system implemented by the cloud computing device 88, and/or may be stored on a database communicatively coupled to the CSM system implemented by the cloud computing device 88, such as database 80. As such, the CSM system may retrieve the stored mapping hierarchy from the database.

At decision block 190, the CSM system may determine whether a trust factor is necessary. In some embodiments, the CSM system may present a user interface to an agent of the CSM system. For example, the user interface of a program or application on a user device 90 used to access the CSM system may include a drop-down menu and the agent may select YES or NO in response to whether a trust factor is necessary. In certain embodiments, the CSM system may analyze the mapping hierarchy to determine whether a trust factor is necessary. For example, the CSM system may determine the asset has few (e.g., less than 2) connections to additional assets in the mapping hierarchy. As a result, the CSM system may determine the mapping hierarchy has missed potential assets. At process block 192 (the YES path of decision block 190), the CSM system may send a request for mapping validation to (please fill in). In certain embodiments, the CSM system may publish the mapping hierarchy and the asset data on a virtual ledger such as a blockchain. In some embodiments, the CSM system may send the request to a remote device associated with the customer. The remote device may display the mapping hierarchy and prompt a user of the remove device to confirm the mapping hierarchy.

At process block 194, the CSM system may receive a confirmation associated with the request. In certain embodiments, the confirmation may be published to a virtual ledger, such as a blockchain. As such, the CSM system may retrieve the confirmation from the virtual ledger. The confirmation may include an identity (e.g., employment title, name, username) associated with the party or individual providing the confirmation. The confirmation may include a representation and/or a visualization of a plant floor associated with an industrial plant system. In certain embodiments, only a portion of the mapping hierarchy may receive a confirmation. For example, the confirming party may provide a confirmation for only a number of assets the confirming party works on. Additionally or alternatively, the confirmation may include a revised representation and/or a revised visualization of the plant floor associated with an industrial plant system. For example, the revised representation may include additional assets, altered locations of assets, altered connection between assets, and the like.

At process block 196, the CSM system may generate a trust factor based on the confirmation. The trust factor may indicate an accuracy of the confirmation. In some embodiments, the CSM system may generate the trust factor based on an identity (e.g., position or title) of the party providing the confirmation. For example, the CSM system may retrieve the identity of the confirming party from a virtual ledger storing the confirmation and/or the mapping hierarchy. In certain embodiments, the CSM system may analyze the identity of the confirming party to generate the trust factor. For example, a plant manager may be more familiar with a plant floor layout of an industrial plant system than a receptionist. Additionally or alternatively, the CSM system may generate the trust factor based on a length of employment of the confirming party. For example, the longer the confirming party has worked at the plant, the greater the trust factor generated by the CSM system. In some embodiments, the CSM system may generate the trust factor based on a comparison between the physical location of the asset and an employment location of the confirming party. For example, if the asset is located in Building C, a confirming party that works in Building C may generate a greater trust factor than a confirming party that works in Building A.

At decision block 198, the CSM system may determine whether the trust factor exceeds a threshold trust factor. The threshold trust factor may be based on the service inquiry, the asset type, the application asset data, the mapping hierarchy, and the like. In certain embodiments, the threshold trust factor may be based on the mapping hierarchy. For example, the threshold trust factor may be higher for critical components in a manufacturing process. In some embodiments, the threshold trust factor may be based on the application asset data. For example, the CSM system may determine the asset is frequently used based on the operational durations in the application asset data. As such, the CSM system may determine the asset is a critical component in a manufacturing process. When the CSM system determines that the trust factor does not exceed the threshold trust factor, the CSM system may return to decision block 192 and send an additional request for mapping validation.

At process block 200 (the YES path of decision block 198), the CSM system may update the mapping hierarchy based on the confirmation. For example, the CSM system may update the mapping hierarchy to include additional assets associated with the confirmation, revise and/or confirm the location of one or more assets associated with the mapping hierarchy, revise and/or confirm connections between one or more assets, and the like. The CSM system may publish the updated mapping hierarchy to the virtual ledger.

When the CSM system determines that a trust factor isn't necessary (at decision block 198), such as when the retrieved application asset data was recently updated (e.g., analyzing a timestamp and/or log associated with the application asset data) the CSM system may update (at process block 202) the service inquiry associated with the asset based on the mapping hierarchy. For example, the CSM system may update the service inquiry with the representation of the plant floor. As a result, an agent of the CSM system may visualize connections between the asset and other assets/components on the plant floor to better assess the cause of the issue associated with the service inquiry. For example, the service inquiry may indicate a lack of sufficient power being supplied to the asset.

At process block 204, the CSM system may send the updated service inquiry to the asset. In certain embodiments, the updated service inquiry may include a request for additional data, such as an additional data field to be completed. For example, the CSM system may determine the issue associated with the service inquiry is related to a failed part. The updated service inquiry may include a request for a specific model number of the part, when the part was last replaced, any maintenance actions performed on the part, and so forth. In certain embodiments, the asset may include a graphical user interface capable of displaying the updated service inquiry and/or the mapping hierarchy. The asset may generate and transmit additional data in response to receiving the updated service inquiry. In certain embodiments, the updated service inquiry may include a request for a customer mapping hierarchy. The customer mapping hierarchy may include a timestamp associated with when the customer mapping hierarchy was generated and/or last updated. The customer mapping hierarchy may be a hierarchical organization of an industrial plant system, such as industrial automation system 10, indicative of a visualization and/or representation of a plant floor.

At process block 206, the CSM system may receive asset data that corresponds to the service inquiry. In certain embodiments, the CSM system may update the service inquiry based on the received asset data. In some embodiments, the asset data may include a second mapping hierarchy, such as the customer mapping hierarchy. The CSM system may compare the customer mapping hierarchy with a generated mapping hierarchy. In certain embodiments, the CSM system may update the generated mapping hierarchy with the customer mapping hierarchy. For example, the CSM system may revise a location of one or more assets, may revise connections between one or more assets, and may update the generated mapping hierarchy with one or more additional assets.

At process block 208, the CSM system may convert asset data based on the (updated) mapping hierarchy. In some embodiments, the CSM system may determine a conversion between the generated mapping hierarchy and the customer mapping hierarchy. In certain embodiments, the CSM system may determine a preferred mapping hierarchy. For example, an agent of the CSM system may select the customer mapping hierarchy or the generated mapping hierarchy for the representation of the plant floor. In certain embodiments, the CSM system may convert asset data based on the selected mapping hierarchy.

As such, the CSM system may convert application asset data according to a customer mapping hierarchy to provide more detailed analysis and/or provide particular maintenance and/or repair tasks according to a customer's desired mapping hierarchy. Additionally or alternatively, the CSM generated mapping hierarchy may be compared with the customer mapping hierarchy to validate and/or generate a trust factor associated with the generated mapping hierarchy.

In some instances, the CSM system may receive service inquiries lacking information about preventative maintenance measures taken by customers. As a result, it may be helpful to integrate additional data associated with maintenance action and/or parts replacements. The asset may also be capable of providing additional data associated with operation and/or maintenance of the asset. The CSM system may receive additional data from any number of sources and may analyze the data to assess and diagnose issues associated with a service inquiry and provide more accurate solutions to the service inquiry.

Figure 11:
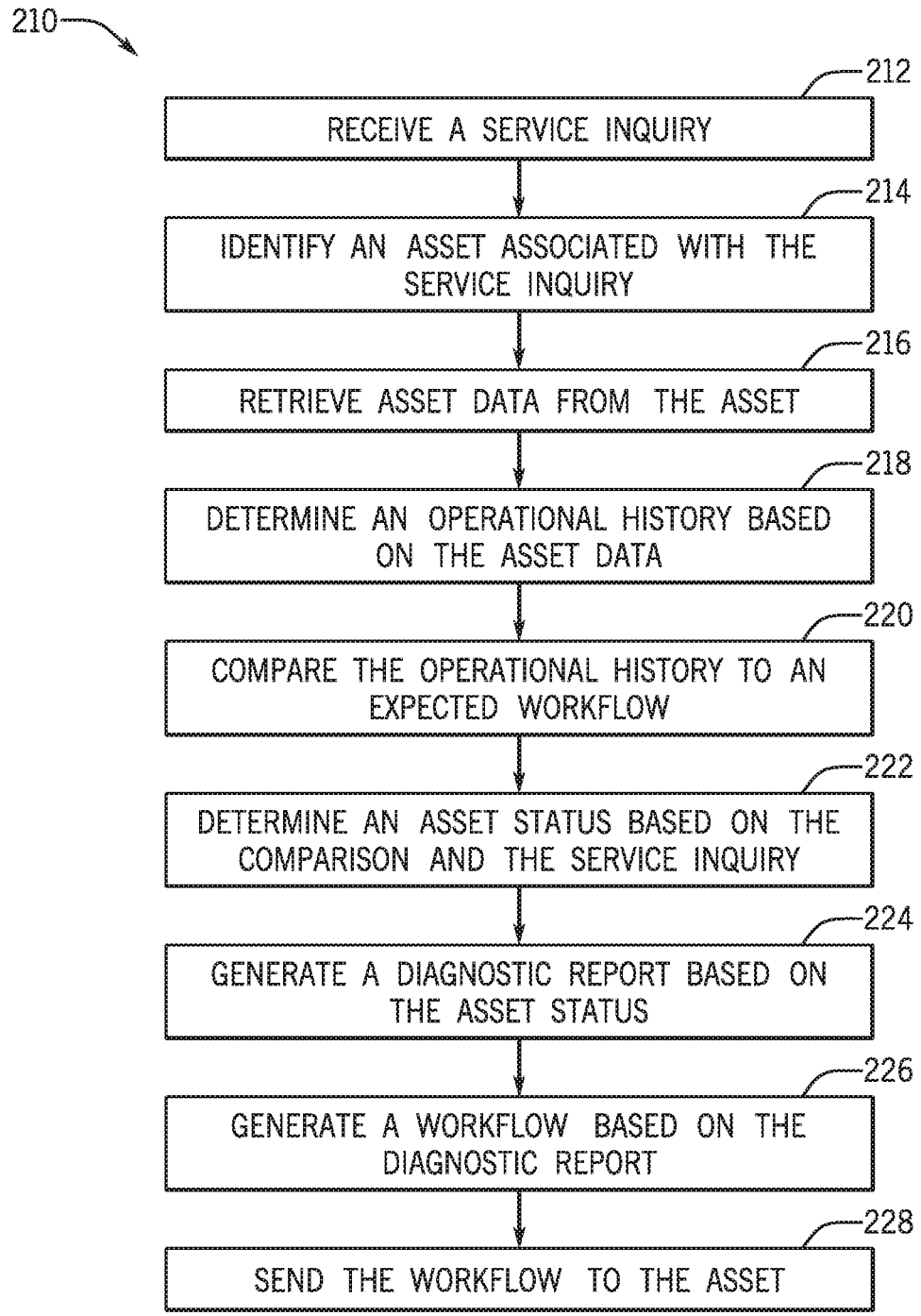
FIG. 11 is a flowchart corresponding to diagnosing issues based on service inquiries with a CSM system, in accordance with an embodiment.

Keeping the foregoing in mind, FIG. 11 is a flowchart of a method 210 performed by the CSM system to determine maintenance action to be performed on an asset based on operational history. Although the method 210 is described below as performed by the CSM system, it should be noted that the method 210 may be performed by any suitable processor that process asset data. Furthermore, certain described steps may be implemented by executing instructions stored in a memory, using any suitable processing circuitry, such as the CSM system. In some embodiments, the memory may include one or more tangible, non-transitory computer-readable media that store instructions executable by any suitable processing circuitry and/or data to be processed by any suitable processing circuitry. For example, the memory may include random access memory (RAM), read only memory (ROM), rewritable non-volatile memory, such as flash memory, hard drives, optical discs, and/or the like. Moreover, although the following description of the method 210 is described in a particular order, it should be noted that the method 210 may be performed in any suitable order.

At process block 212, the CSM system may receive a service inquiry associated with an asset. For example, the CSM system may receive the service inquiry from the asset or a controller (e.g., in the industrial control system 22) that controls the asset. More specifically, the asset or industrial control system 22 may automatically generate and may transmit the service inquiry in response to detecting an issue or potential issue associated with the asset (e.g., operational parameter greater than a threshold parameter value). In some embodiments, the CSM system may receive the service inquiry from a component of a communication network associated with the customer, such as the edge computing device 86.

At process block 214, the CSM system may identify an asset associated with the service inquiry. In certain embodiments, the service inquiry may include one or more data fields completed by the customer. The service inquiry may include information indicative of an asset. For example, the service inquiry may include an asset type data field, an asset model data field, or the like. In certain embodiments, the service inquiry may include a drop-down menu for selecting an asset type and/or an asset model.

At process block 216, the CSM system may retrieve asset data from the asset. In certain embodiments, the CSM system may send a request for asset data. For example, the CSM system may transmit the request to the asset or the industrial control system 22. In some embodiments, the CSM system may receive operational data, customer data, inventory data, telemetry data, and any other suitable data as described herein. Additionally or alternatively, the CSM system may retrieve asset data from a database associated with the asset manufacturer. For instance, because the CSM system may determine a manufacturer of the asset based on the inquiry that may identify the manufacturer (e.g., via a data field completed by the customer or metadata 104A that may be included in the service inquiry), the CSM system may request the asset data from the manufacturer of the asset. In some embodiments, the CSM system may retrieve asset data from a distributed ledger, such as a blockchain.

At process block 218, the CSM system may determine an operational history based on the asset data. The operational history may include a record of maintenance actions performed on the asset. In certain embodiments, the record of maintenance actions may include part replacements, software updates, asset shutoff procedures, periodic maintenance actions, and the like. In some embodiments, the operational history may include a set of completed workflows. Each completed workflow may include a set of actions performed on the asset, a timestamp associated with the beginning of the workflow, a timestamp associated with an ending of the workflow, a timestamp associated with a beginning of each action of the set of actions, a time stamp associated with an ending of each action of the set of actions, and the like. In some embodiments, the operational history may include a record of maintenance actions performed on one or more other assets associated with an industrial plant system.

At process block 220, the CSM system may compare the operational history to an expected workflow. An expected workflow may include any number of expected maintenance actions to be performed on the asset. For example, a schedule of expected maintenance actions may be based on an operational lifecycle of the asset, an operational lifecycle of a part associated with the asset, a total operational duration associated with the asset, a total operational duration associated with a part, a periodic maintenance procedure (e.g., weekly, monthly, annually), and the like. For example, the asset manufacturer may recommend a set of maintenance actions be performed when a part is replaced and/or after a part is used for a particular amount of time or number of operations. As additional examples, the asset manufacturer may recommend a set of maintenance actions be performed based on a percentage (e.g., five percent, ten percent, twenty percent, fifty percent) of the operational lifecycle of the asset and/or a percentage of the operational lifecycle of a part associated with the asset.

At process block 222, the CSM system may determine an asset status based on the comparison and the service inquiry. The asset status may be indicative of an operational health of the asset. For example, the CSM system may generate an operational health report based on the total operational duration of the asset and the expected lifecycle of the asset. The operational health report may include a remaining lifecycle for the asset, a remaining lifecycle for any number of parts associated with the asset, a workflow (e.g., set of maintenance actions to be performed) based on the remaining lifecycle for the asset and/or a remaining lifecycle for a corresponding part, and the like. In some embodiments, the operational health report may be based on a remaining lifecycle for any number of parts associated with the asset. For example, the operational health report may include a percent (e.g., five percent, ten percent, twenty five percent, fifty percent, and so on) of operational lifecycle remaining for any number of parts Additionally or alternatively, the CSM system may determine the operational health based on a set of operational health factors, such as an expected lifecycle of the asset itself and the total operational duration of the asset, an expected lifecycle of a part associated with the asset and the total operational duration of the part, a set of maintenance actions yet to be performed, and the like. In certain embodiments, the CSM system may determine the asset status based on the least operationally healthy aspect of the asset. For example, the CSM system may determine the asset has fifty percent remaining in its lifecycle and a part included in the asset has ten percent remaining in its lifecycle. As a result, the CSM system may determine the operational health of the asset based on the remaining lifecycle of the part. Additionally or alternatively, the CSM system may determine the asset requires additional maintenance based on a set of missed maintenance actions. In certain embodiments, the CSM system may determine a set of missed maintenance actions correspond to an issue associated with the service inquiry. For example, the set of missed maintenance actions may be intended to prevent and/or remedy the issue associated with the service inquiry. In certain embodiments, the CSM system may weight the set of operational health factors. For example, the expected lifecycle of the asset may be weighted more heavily than a set of missed maintenance actions. Additionally or alternatively, the CSM system may determine a projected change to the operational health report based on a set of maintenance actions. For example, the CSM system may determine how the operational health of an associated asset is affected by performing any number of maintenance actions (e.g., replacing a worn part), such that the CSM system may determine and/or select any number of maintenance actions corresponding to a threshold change (e.g., above a threshold percentage) in the operational health of the associated asset. Additionally or alternatively, the CSM system may select a maintenance action corresponding to a greatest change in operational health associated with the asset. In certain embodiments, the CSM system may include the selected maintenance action(s) in a workflow to be performed on the associated asset.

At process block 224, the CSM system may generate a diagnostic report based on the asset status. For example, the diagnostic report may include the set of missed maintenance actions, a remaining lifecycle associated with one or more parts of an asset, a remaining lifecycle of the asset based on the total operational duration of the asset, the asset status, the operational health, and the like. In some embodiments, the CSM system may store the diagnostic report on a database and/or on a virtual ledger. In certain embodiments, CSM system may transmit the diagnostic report. For example, the CSM system may transmit the diagnostic report to the asset, and the asset may include a graphical user interface for displaying the diagnostic report. Additionally or alternatively, the CSM system may transmit the diagnostic report to a remote device associated with the customer, such as a computing device included in the control room 74.

At process block 226, the CSM system generate a workflow based on the diagnostic report. In certain embodiments, the workflow may include a set of steps to be performed to address and/or correct the issue that is the subject of the received service inquiry. For example, the workflow may include a shutoff step, a lockout step, a part replacement step, a software reset step, a software update step, and/or any other suitable step. In some embodiments, the workflow may include a number of recommended maintenance steps. For example, maintenance steps may be recommended based on an operational lifetime of the asset, an operational lifetime of a part of the asset, an expected lifecycle of the asset, an expected lifecycle of a component of the asset, and so forth. In certain embodiments, the workflow may include a schedule for the workflow to be performed. Additionally or alternatively, a maintenance action may include ordering and/or shipping a new part associated with the asset to replace a worn part. In certain embodiments, the set of maintenance actions may include a set of safety actions such that the asset may be properly shut down and/or prevented from restarting before completion of a maintenance workflow (e.g., lock out/tag out procedure). For example, a safety action may include isolating a power source associated with the asset and/or attaching a safety device to prevent activation of a switch, valve, button, or any other suitable startup control from being used to startup the asset.

At process block 228, the CSM system may send the workflow to the asset, the industrial control system 22, or the edge device 86. The CSM system may also provide a notification indicative of the workflow. In certain embodiments, the CSM system may send the workflow and a notification to the asset, and a display of the asset (or a display communicatively coupled to the asset) may display a first step of the workflow. In certain embodiments, the CSM system may send the notification to a control system associated with the asset (e.g., industrial control system 22). Additionally or alternatively, the control system may control the operating parameters of the asset in response to receiving the notification. That is, the control system may adjust the operation of the asset based on the workflow.

As such, the CSM system may retrieve asset data in response to a service inquiry to more accurately diagnose issues associated with the service inquiry and provide a suggested set of maintenance and repair actions (e.g., replacement of worn parts) to be carried out on the asset and/or performed by the asset.

While only certain features of the present embodiments described herein have been illustrated and described herein, many modifications and changes will occur to those skilled in the art. It is, therefore, to be understood that the appended claims are intended to cover all such modifications and changes as fall within the true spirit of the disclosure.

The invention claimed is:

1. A non-transitory computer-readable medium comprising computer-executable instructions that, when executed, cause one or more processors of a first electronic device to:
receive data generated by a plurality of components of an industrial automation system;
generate characterized data by applying metadata to one or more portions of the data, wherein the metadata enables a cloud computing device receiving the data to determine one or more contexts of the one or more portions of the data, wherein each of the one or more contexts comprise:
the one or more portions of the data being associated with a particular component of the plurality of components;
the one or more portions of the data being associated with a particular hierarchical level of a plurality of hierarchical levels of the industrial automation system; or
a type of the data;
rearrange an order of the one or more portions of the data to generate characterized and rearranged data; and
cause the characterized and rearranged data to be sent to the cloud computing device, wherein the cloud computing device is configured to:
analyze the characterized and rearranged data, based on the metadata, to diagnose one or more errors associated with the plurality of components of the industrial automation system;
determine, based on the metadata, one or more computing devices to which to send at least a portion of the characterized and rearranged data, wherein the one or more computing devices are different than the first electronic device and communicatively coupled to the cloud computing device; and
send the at least a portion of the characterized and rearranged data to the one or more computing devices.

2. The non-transitory computer-readable medium of claim 1, wherein:
the first electronic device is controlled by a first party; and
the cloud computing device is controlled by a second party that is different than the first party.

3. The non-transitory computer-readable medium of claim 2, wherein the one or more contexts comprise the one or more portions of the data being associated with the particular component of the plurality of components and the particular hierarchical level of the plurality of hierarchical levels.

4. The non-transitory computer-readable medium of claim 2, wherein the one or more contexts comprise the type of the data.

5. The non-transitory computer-readable medium of claim 2, wherein the first electronic device comprises an edge computing device.

6. The non-transitory computer-readable medium of claim 1, wherein the instructions, when executed, cause the one or more processors of the first electronic device to rearrange the order of the one or more portions of the data based on the one or more contexts.

7. The non-transitory computer-readable medium of claim 6, wherein the one or more contexts comprise the one or more portions of the data being associated with a particular component of the plurality of components.

8. The non-transitory computer-readable medium of claim 6, wherein the one or more contexts comprise the one or more portions of the data being associated with the particular hierarchical level of the plurality of hierarchical levels of the industrial automation system.

9. A computer-implemented method, comprising:
receiving, via a first electronic device, data generated by a plurality of components of an industrial automation system, wherein the data comprises a plurality of portions having an original order;
generating characterized data by applying, via the first electronic device, metadata to one or more portions of the plurality of portions of the data, wherein the metadata enables a cloud computing device receiving the data to determine one or more components of the plurality of components to which the one or more portions of the data pertain;
rearranging, via the first electronic device, the data by modifying the original order of the one or more portions of the data to generate characterized and rearranged data; and
causing, via the first electronic device, the characterized and rearranged data to be sent to the cloud computing device, wherein the cloud computing device is configured to:
analyze the characterized and rearranged data, based on the metadata, to diagnose one or more errors associated with the plurality of components of the industrial automation system;
determine, based on the metadata, one or more computing devices to which to send at least a portion of the characterized and rearranged data, wherein the one or more computing devices are different than the first electronic device and communicatively coupled to the cloud computing device; and
send the at least a portion of the characterized and rearranged data to the one or more computing devices.

10. The computer-implemented method of claim 9, comprising encrypting, via the first electronic device, the characterized and rearranged data prior to causing the characterized and rearranged data to be sent to the cloud computing device.

11. The computer-implemented method of claim 10, comprising rearranging the data prior to encrypting the characterized and rearranged data.

12. The computer-implemented method of claim 9, wherein rearranging the data comprises modifying the original order by grouping one or more portions of the data together based on the one or more portions of the data being associated with a particular hierarchical level within the industrial automation system.

13. The computer-implemented method of claim 9, wherein:

the first electronic device is controlled by a first entity; and the cloud computing device is controlled by a second entity that is different than the first entity.

14. A non-transitory computer-readable medium comprising computer-executable instructions that, when executed, cause one or more processors of a cloud computing device to:

receive, from another electronic device communicatively coupled to the cloud computing device, characterized and rearranged data generated by the other electronic device, wherein the characterized and rearranged data is generated by:

applying metadata to one or more portions of data generated by a plurality of components of an industrial automation system; and rearranging an order of the one or more portions of the data;

determine one or more contexts of the one or more portions of the data generated by the plurality of components of the industrial automation system, wherein each of the one or more contexts comprise:

the one or more portions of the data being associated with a particular component of the plurality of components;

the one or more portions of the data being associated with a particular hierarchical level of a plurality of hierarchical levels of the industrial automation system; or a type of the data; and determine, based on the metadata, one or more computing devices communicatively coupled to the cloud computing device to which to send at least a portion of the characterized and rearranged data, wherein the one or more computing devices are different than the other electronic device; and send the at least a portion of the characterized and rearranged data to the one or more computing devices.

15. The non-transitory computer-readable medium of claim 14, wherein the other electronic device comprises an edge computing device.

16. The non-transitory computer-readable medium of claim 14, wherein the instructions, when executed, cause the one or more processors of the cloud computing device to determine, based on the metadata, that a component has been added to the industrial automation system.

17. The non-transitory computer-readable medium of claim 16, wherein the instructions, when executed, cause the one or more processors of the cloud computing device to determine at least a portion of the one or more contexts pertaining to the component added to the industrial automation system.

18. The non-transitory computer-readable medium of claim 4, wherein the type of the data is audio data, image data, or inventory data.

19. The non-transitory computer-readable medium of claim 14, wherein the instructions, when executed, cause the one or more processors of the cloud computing device to:

receive, from the one or more computing devices communicatively coupled to the cloud computing device, second data generated by the one or more computing devices based on analyzing the at least a portion of the characterized and rearranged data;

apply second metadata to one or more portions of the second data, wherein the second metadata enables the other device to determine that the one or more portions of the second data relate to a software update, a security determination, a maintenance operation, or a diagnostic operation; and send the one or more portions of the second data with the second metadata to the other electronic device.

20. The non-transitory computer-readable medium of claim 19, wherein the second metadata is indicative of:

the one or more portions of the second data being associated with the particular component of the plurality of components; or the one or more portions of the data being associated with the particular hierarchical level of the plurality of hierarchical levels of the industrial automation system.

* * * * *